United States Patent [19]
Kitani et al.

[11] Patent Number: 5,621,206
[45] Date of Patent: Apr. 15, 1997

[54] METHOD OF PRODUCING A PHOTOELECTRIC CONVERTING DEVICE

[75] Inventors: Masashi Kitani, Yokohama; Toyoki Matsushima, Atsugi; Tetsuya Shimada, Zama; Makoto Ogura, Isehara; Masayoshi Murata, Atsugi; Katsumi Komiyama, Isehara; Tomokazu Dainobu, Hiratsuka, all of Japan

[73] Assignee: Canon Kabushiki Kaisha, Tokyo, Japan

[21] Appl. No.: 468,911

[22] Filed: Jun. 6, 1995

Related U.S. Application Data

[60] Continuation of Ser. No. 284,989, Aug. 4, 1994, abandoned, which is a division of Ser. No. 1,637, Jan. 7, 1993, Pat. No. 5,352,883, which is a division of Ser. No. 616,921, Nov. 21, 1990, Pat. No. 5,196,691.

Foreign Application Priority Data

| Nov. 21, 1989 | [JP] | Japan | 1-302669 |
| Nov. 21, 1990 | [JP] | Japan | 1-302670 |
| Nov. 21, 1990 | [JP] | Japan | 1-302671 |

[51] Int. Cl.$^6$ .................................... H01J 40/14
[52] U.S. Cl. ........................ 250/208.1; 425/808
[58] Field of Search ............ 250/208.1; 358/471, 358/472, 482, 483, 493–497; 425/808, 116

[56] References Cited

U.S. PATENT DOCUMENTS

| 3,947,210 | 3/1976 | Levites | 425/441 |
| 4,698,089 | 10/1987 | Matsuzaka et al. | 425/808 |
| 4,826,417 | 5/1989 | Reilly et al. | 425/116 |
| 4,900,242 | 2/1990 | Maus et al. | 425/808 |
| 4,908,718 | 3/1990 | Shimada | 250/208.1 |
| 4,970,607 | 11/1990 | Itagaki et al. | 358/493 |
| 4,977,313 | 12/1990 | Nagata et al. | 250/208.1 |
| 4,985,617 | 1/1991 | Ogushi | 250/208.1 |
| 4,988,274 | 1/1991 | Kenmochi | 425/808 |
| 5,093,049 | 3/1992 | Uehara et al. | 425/808 |
| 5,196,691 | 3/1993 | Kitani et al. | 250/208.1 |
| 5,352,883 | 10/1994 | Kitani et al. | 250/208.1 |

*Primary Examiner*—Stephone Allen
*Attorney, Agent, or Firm*—Fitzpatrick, Cella, Harper & Scinto

[57] ABSTRACT

A method of producing an optical device, includes the steps of forming a space between an optical member and a first mold and a second mold by arranging the optical member between the first mold and the second mold, at least either the first or second mold is arranged to touch one surface of the optical member. A resin member is injected through an injection port provided with the first or second mold in the formed space.

9 Claims, 14 Drawing Sheets

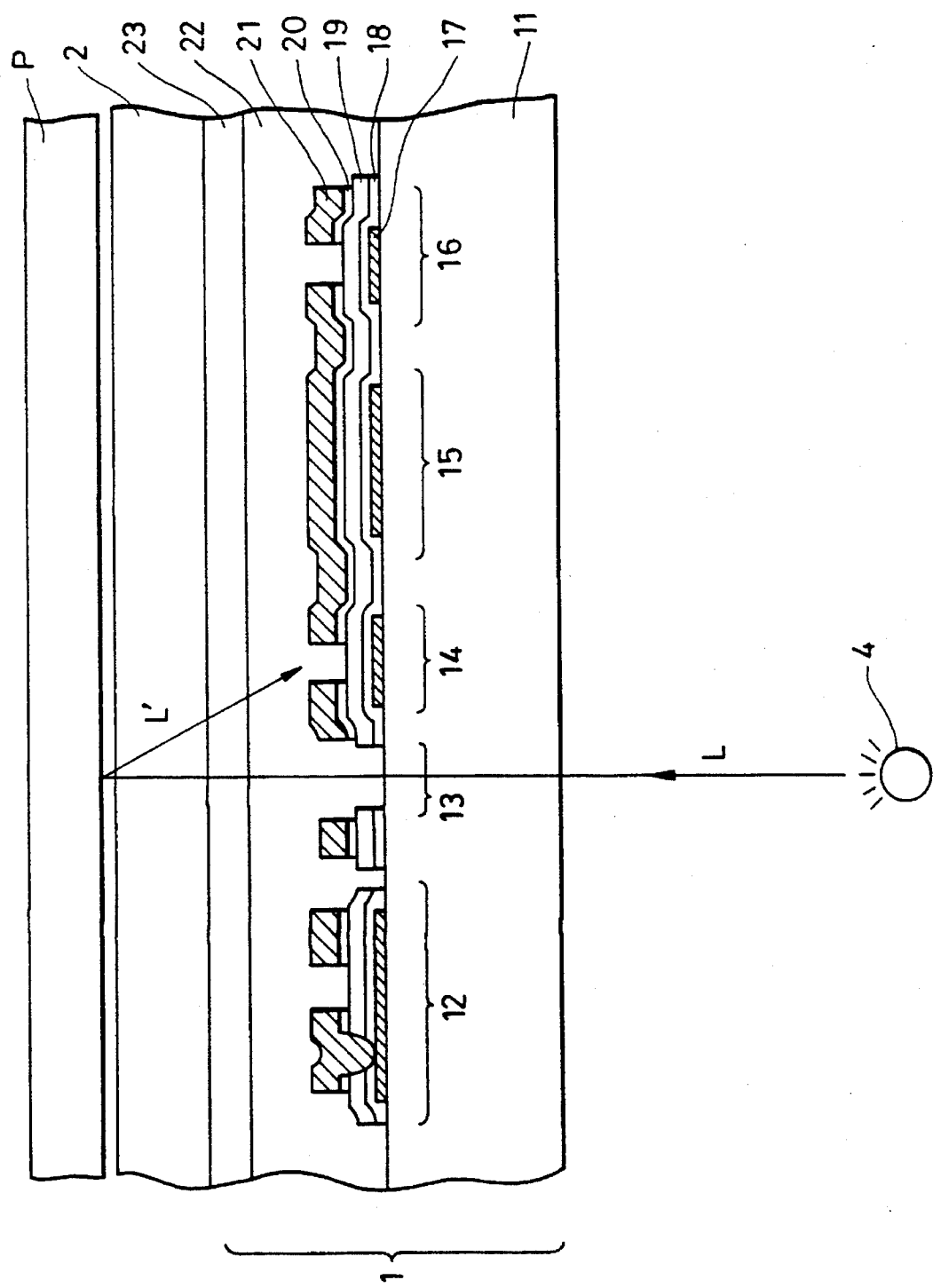

5,621,206

METHOD OF PRODUCING A PHOTOELECTRIC CONVERTING DEVICE

This application is a continuation of application Ser. No. 08/284,989, now abandoned, filed Aug. 4, 1994, which is a division of application Ser. No. 08/001,637, now U.S. Pat. No. 5,352,883, filed Jan. 7, 1993, which was a division of application Ser. No. 07/616,921 now U.S. Pat. No. 5,196,691, filed Nov. 21. 1990.

BACKGROUND OF THE INVENTION

1. Field of the Invention

The present invention relates to a photoelectric converting device having a guide member, and, more particularly, to a photoelectric converting device having a guide member which can be suitably used in an input portion of an image processing apparatus such as a facsimile machine, an image reader, a digital copying machine, an electronic blackboard and the like for reading image information of an original sheet by relatively moving the original sheet the image of which is to be read while bringing the original sheet into closely contact with a one-dimensional line sensor.

2. Description of the Prior Art

Recently, an elongated line sensor, which can be used in an equal magnification optical system, has been developed as a photoelectric converting device for the purpose of reducing the size and improving the performance of an image processing apparatus such as a facsimile machine and an image reader and the like.

In order to reduce the size and the cost of an image processing apparatus of the type described above, a photoelectric converting device having a guide member have been disclosed which is constituted in such a manner that the equal magnification fiber lens array is replaced by a structure in which light reflected from the original sheet is directly detected by a sensor via a transparent spacer made of, for example, glass.

FIG. 1 is a schematic cross sectional view which illustrates a conventional photoelectric converting device when viewed from the main scanning direction of a photoelectric converting element array thereof.

Referring to FIG. 1, reference numeral 1 represents a light transmissive sensor substrate constituted in such a manner that a photoelectric converting element (omitted from illustration) is formed on a light transmissive substrate made of glass or the like by a semiconductor manufacturing process or the like. A transparent protection layer 2 made of a thin glass plate or the like is formed on the photoelectric converting element.

The light transmissive sensor substrate 1 is secured to a base plate 3 made of aluminum or the like.

An illumination opening 5 through which illumination light L emitted from a light source 4 passes is formed in a portion of the base plate 3. Reference numeral 4 represents the above-described light source for illuminating original sheet P, the light source 4 comprising an LED array composed by arranging a plurality of LED chips in an array-like configuration.

Reference numeral 6 represents a conveyance roller for conveying the original sheet P by bringing the original sheet P into contact with the transparent protection layer 2.

As a result of the structure thus constituted, illumination light L emitted from the light source 4 passes through the light transmissive sensor substrate 1 before it illuminates the original sheet P. Light corresponding to information about the original sheet P and reflected from the same is made incident upon the photoelectric converting device disposed on the light transmissive sensor substrate 1 so that it is converted into an electric signal before transmitted as an image signal.

Referring to FIG. 1, original-sheet conveyance guide means 7 is disposed on the light transmissive sensor substrate 1 on the original-sheet supply side which opposes the original-sheet conveying direction. The structure shown in FIG. 1 is arranged in such a manner that a portion of the base plate 3 is arranged to project so that the original sheet P passes over the surface of the thus formed projection.

Usually, the light transmissive sensor substrate 1 is arranged in such a manner that a multiplicity of photoelectric converting element arrays are, by the semiconductor manufacturing process, formed on the large size glass substrate and the glass substrate is then sectioned into pieces each of which contains the photoelectric converting element array by using a slicer or the like. Therefore, there arises a problem in that burrs (omitted from illustration) such as chipping are formed at the edge of the light transmissive sensor substrate 1.

Accordingly, a structure has been employed in which a gap the size of which corresponds to the size of the burrs which will be formed at the edge of the light transmissive sensor substrate 1 is provided between the guide means 7 and the light transmissive sensor substrate 1.

However, the front portion of the original sheet P will be caught by the above-described gap, causing a jam to occur after the front portion of the original sheet P has been conveyed toward the read portion from the original-sheet supply side.

Therefore, the conventional photoelectric converting device has been arranged in such a manner that the height of the guide means 7 is made larger than that of the light transmissive sensor substrate 1 so that the above-described problem takes place in that the front portion of the original sheet can be caught by the gap.

However, the above-described conventional photoelectric converting device of the type described above has the following problems in the case where the overall cost and the size of the photoelectric converting device are desired to be reduced.

In order to reduce the overall cost and the size of the photoelectric converting device, it might be considered feasible to employ a method arranged in such a manner that the width of the light transmissive sensor substrate, that is, the width of the light transmissive sensor substrate in the direction in which the original sheet is conveyed, is reduced so that the number of the sections of the large-size substrate including the photoelectric converting devices is enlarged.

However, in the case where the width of the light transmissive sensor substrate 1 in the direction in which the original sheet is conveyed is reduced, the front portion of the guide means 7 and the conveyance roller 6 undesirably come closer to each other, causing the space in which the original sheet is conveyed to be reduced. As a result, a jam will easily occur in accordance with the state of the front portion of the original sheet.

For example in a case where an original sheet having a small thickness is conveyed, the front portion of the original sheet usually has a curvature (the front portion of the original sheet usually curves). Therefore, a jam will occur.

Furthermore, in a case where an original sheet having a large thickness is conveyed, the rigidity of the original sheet is too strong, causing the original sheet to positioned farther from the protection layer. As a result, the depth of field cannot be maintained, causing the S/N ratio to deteriorate critically.

Another disclosure has been made which is, as shown in FIG. 2, arranged in such a manner that the protection layer 2 of the light transmissive sensor substrate 1 and the guide means 7 for conveying the original sheet are combined into one component so as to overcome the above-described problem experienced with the above-described conventional photoelectric converting device.

However, it is very difficult to select a material which is able to perform both the function as the protection layer and the function as the guide means. Therefore, there have been unsolved problems in terms of the overall performance of the photoelectric converting device and the reduction in the maintenance cost.

For example, in a case where an organic film is employed as the above-described material serving as the above-described two functions, damages occur in the surface of the film and dust adheres to the same due to the large frictional force generated while conveying the original sheet. As a result, a problem arises in that the S/N ratio will deteriorate with the lapse of time.

SUMMARY OF THE INVENTION

Accordingly, an object of the present invention is to provide a photoelectric converting device having a guide member capable of always stably reading an original sheet.

Another object of the present invention is to provide a photoelectric converting device and an image processing apparatus in which a jam and a problem in that an original sheet cannot be conveyed normally can be prevented at the time of the conveyance of the original sheet regardless of the type (the material and the thickness) of the original sheet.

Another object of the present invention is to provide a photoelectric converting device and an image processing apparatus the overall cost and the size of which can be easily reduced.

Another object of the present invention is to provide a photoelectric converting device and an image processing apparatus capable of reliably conveying an original sheet into a focusing range and assuredly reading the original sheet regardless of the type (the material and the thickness) of the original sheet.

An object of the present invention is to provide a photoelectric converting device and an image processing apparatus exhibiting excellent durability, capable of reducing the maintenance cost or eliminating the necessity of the maintenance and preventing the deterioration in the S/N ratio (at reading operation) which will occur with the lapse of time.

An aspect of the invention lies in a photoelectric converting device comprising: a plurality of photoelectric converting elements disposed to confront an original sheet the image information of which is to be read; a protection layer disposed on the photoelectric converting element; a light transmissive substrate on which the photoelectric converting elements are disposed; and flexible guide means disposed on the original-sheet supply side of the light transmissive substrate, the guide means being disposed in such a manner that at least a portion of the guide means is positioned in contact with the edge surface of the light transmissive substrate.

An aspect of the present invention lies in a photoelectric converting device comprising: a plurality of photoelectric converting elements disposed to confront an original sheet the image information of which is to be read; a protection layer disposed on the photoelectric converting element; a light transmissive substrate on which the photoelectric converting elements are disposed; and guide means disposed on the original-sheet supply side of the light transmissive substrate, the guide means extending in such a manner that at least a portion of the guide means is positioned in contact with the upper surface of the protection layer.

An aspect of the present invention lies in a photoelectric converting device comprising: a plurality of photoelectric converting elements disposed to confront an original sheet the image information of which is to be read; a protection layer disposed on the photoelectric converting element; a light transmissive substrate on which the photoelectric converting elements are disposed; and guide means disposed on the original-sheet supply side of the light transmissive substrate, the guide means being a film made of a flexible material.

An aspect of the present invention lies in an image processing apparatus comprising: a photoelectric converting device including; a plurality of photoelectric converting elements disposed to confront an original sheet the image information of which is to be read; a protection layer disposed on the photoelectric converting element; a light transmissive substrate on which the photoelectric converting elements are disposed; and flexible guide means disposed on the original-sheet supply side of the light transmissive substrate, the guide means being disposed in such a manner that at least a portion of the guide means is positioned in contact with the edge surface of the light transmissive substrate; a light source for illuminating the original sheet; conveyance means for conveying the original sheet; an output portion for performing recording in accordance with an electric signal denoting image information; and controller for controlling the photoelectric converting device, the light source, the conveyance means and the output portion.

An aspect of the present invention lies in an image processing apparatus comprising: a photoelectric converting device including; a plurality of photoelectric converting elements disposed to confront an original sheet the image information of which is to be read; a protection layer disposed on the photoelectric converting element; a light transmissive substrate on which the photoelectric converting elements are disposed; and guide means disposed on the original-sheet supply side of the light transmissive substrate, the guide means extending in such a manner that at least a portion of the guide means is positioned in contact with the surface of the protection layer; a light source for illuminating the original sheet; conveyance means for conveying the original sheet; an output portion for performing recording in accordance with an electric signal denoting image information; and controller for controlling the photoelectric converting device, the light source, the conveyance means and the output portion.

An aspect of the present invention lies in an image processing apparatus comprising: a photoelectric converting device including; a plurality of photoelectric converting elements disposed to confront an original sheet the image information of which is to be read; a protection layer disposed on the photoelectric converting element; a light transmissive substrate on which the photoelectric converting elements are disposed; and guide means disposed on the original-sheet supply side of the light transmissive substrate, the guide means being a film made of a flexible material; a light source for illuminating the original sheet; conveyance means for conveying the original sheet; an output portion for performing recording in accordance with an electric signal denoting image information; and controller for controlling the photoelectric converting device, the light source, the conveyance means and the output portion.

Other and further objects, features and advantages of the invention will be appear more fully from the following description.

BRIEF DESCRIPTION OF THE DRAWINGS

FIG. 8 is a schematic cross sectional view which illustrates a light transmissive sensor substrate according to embodiments shown in FIGS. 1 to 4 and FIGS. 10 to 16 when viewed from the main scanning direction of the photoelectric converting element array;

DESCRIPTION OF THE PREFERRED EMBODIMENTS

An aspect of the present invention lies in a structure arranged in such a manner that guide means for conveying an original sheet is disposed in such a manner that at least a portion is positioned in contact with a light transmissive substrate. Another aspect of the same lies in a structure arranged in such a manner that the guide means for conveying the original sheet is made of a flexible material. Another aspect of the same lies in a structure arranged in such a manner that the guide means for conveying the original sheet extends to the surface of the protection layer of the photoelectric converting device. As a result, a problem such as a jam taken place in that the original sheet cannot be conveyed normally can be prevented. Simultaneously, the deterioration in the S/N ratio can be prevented. As a result, the overall cost and the size of the photoelectric converting device can be reduced.

Furthermore, the overall cost and the size of an image processing apparatus having the above-described photoelectric converting device can be reduced.

Then, the present invention will be described in detail with reference to the drawings.

Figure 5:
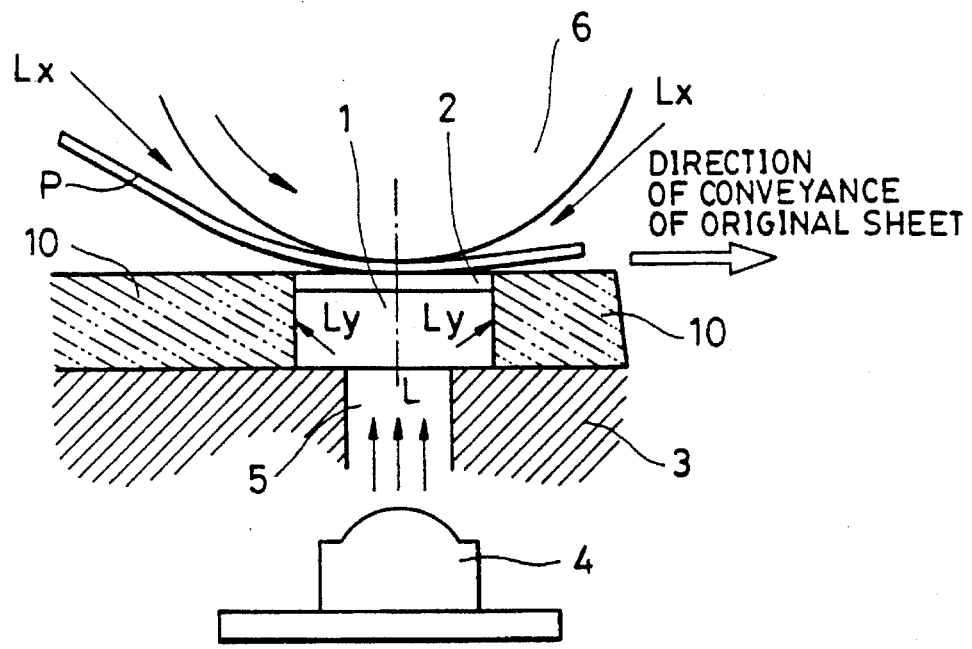
FIG. 5 is a schematic cross sectional view which illustrates a third embodiment of the photoelectric converting device according to the present invention.

FIG. 5 is a schematic cross sectional view which illustrates a first preferred embodiment of a photoelectric converting element array of a photoelectric converting device according to the present invention when viewed from the main scanning direction.

Reference numeral 1 represents a light transmissive sensor substrate having a photoelectric converting element array (omitted from illustration) formed by a semiconductor manufacturing process on a substrate made of quartz glass or borosilicate glass having light transmissive characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into directly contact with the protection layer 2.

As a result of the structure thus arranged, the illumination light L emitted from the light source 4 passes through the opening 5 formed in the base plate 3 and the light transmissive sensor substrate 1 before it illuminates the original sheet P. Information light L' reflected from the surface of the original sheet P is made incident upon the photoelectric converting element (omitted form illustration) formed on the light transmissive sensor substrate 1 before an image signal is transmitted from the photoelectric converting element.

A guide means 7 for conveying the original sheet P is disposed on the light transmissive sensor substrate 1 on the original-sheet supply side opposing the original-sheet conveyance direction. The guide means 7 is disposed in such a manner that at least a portion thereof is positioned in contact with the edge of the light transmissive sensor substrate 1 and that the protection layer 2, the edge being the edge adjacent to the original-sheet supply side. The guide means 7 is substantially continuously formed from the surface of the protection layer 2. The guide means 7 may be formed in a flat shape as illustrated, a shape having slanted surface or a shape having a curved surface.

The guide means 7 may be secured to the edge portion of the above-described light transmissive sensor substrate 1 or may be positioned in contact with the same. As an alternative to this, the guide means 7 may be disposed while providing a gap from the light transmissive sensor substrate 1 if the gap is smaller enough to prevent the introduction of the original sheet P. In terms of the prevention of the occurrence of the jam, it is preferable that the guide means 7 be positioned in closely contact with the edge of the light transmissive sensor substrate 1.

It is preferable that the guide means 7 be made of an organic resin material such as acryl, unsaturated polyester, polystyrene, hard polyurethane and silicone organic resin materials. In addition, an organic resin material such as polyester, epoxy, polyethylene, vinyl chloride, polypropylene, nylon, and polycarbonate organic resin materials may be employed.

Since the guide means 7 for conveying the original sheet P is secured to the edge on the original sheet supply side of the light transmissive sensor substrate 1 and that of the protection layer 2, no gap is formed between the light transmissive sensor substrate 1 and the guide means 7. Therefore, a jam taken place due to an introduction of the front portion of the original sheet P can be prevented. Furthermore, since the surface of the guide means 7 is continuous formed from the surface of the protection layer 2, no step is formed between the light transmissive sensor substrate 1 and the guide means 7. As a result, even if an original sheet having a large thickness is desired to be read, the original sheet cannot separate from the surface of the protection layer 2. Consequently, the reduction in the S/N ration can be prevented.

Figure 3:
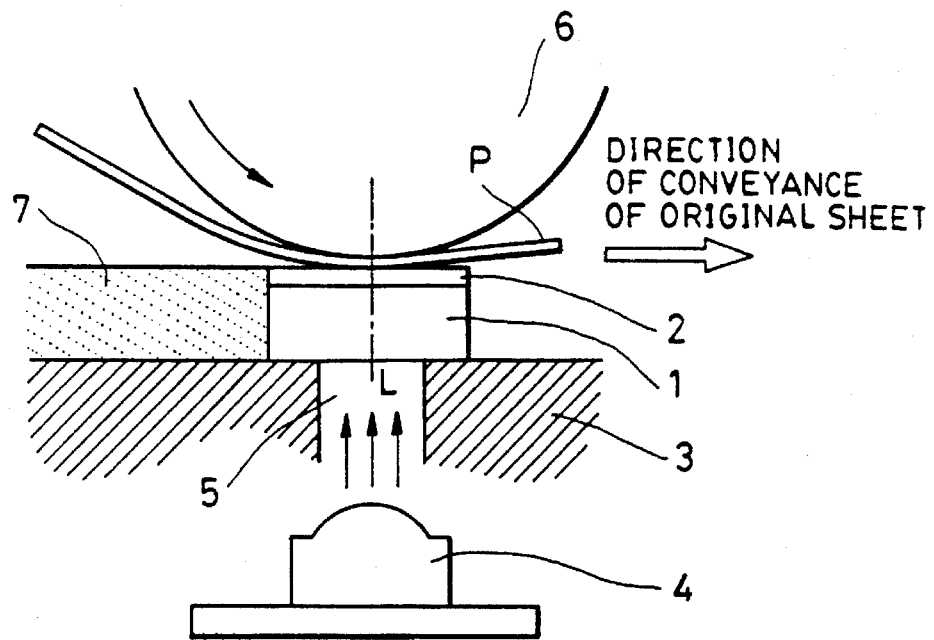
FIG. 3 is a schematic cross sectional view which illustrates a first embodiment of a photoelectric converting device according to the present invention.
Figure 4:
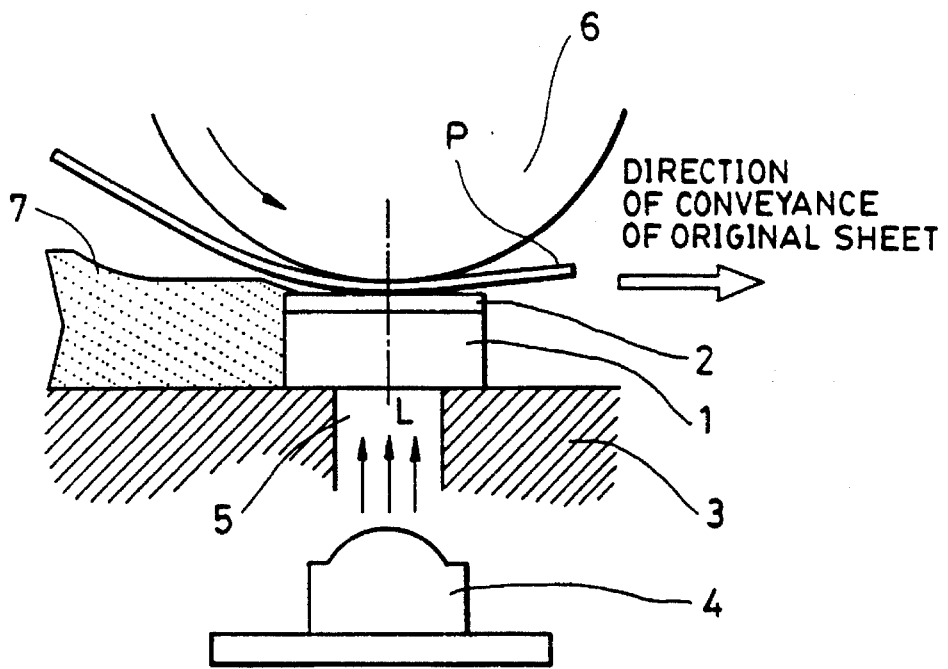
FIG. 4 is a schematic cross sectional view which illustrates a second embodiment of the photoelectric converting device according to the present invention.

FIG. 4 is a schematic cross sectional view which illustrates the photoelectric converting element array of the photoelectric converting device according to a second embodiment of the present invention when viewed from the main scanning direction. The difference between this embodiment and the first embodiment shown in FIG. 3 lies in that the guide means according to the first embodiment is arranged to extend to the surface region at which the same do not come in contact with the conveyance means on the protection layer while having a continuous slanted surface from the surface of the protection layer.

According to this embodiment, similarly to the first embodiment shown in FIG. 3, no gap is formed between the light transmissive sensor substrate 1 and the guide means 7. Therefore, a jam of the original sheet can be prevented. In addition, since this embodiment is arranged in such a manner that the guide means 7 is arranged to have a continuous slanted surface from the surface of the light transmissive sensor substrate 1, no step is formed between the light transmissive sensor substrate 1 and the guide means 7. As a result, floating of the original sheet can be effectively prevented and the deterioration in the S/N ratio can be prevented.

FIG. 5 is a schematic cross sectional view which illustrates the photoelectric converting element array of the photoelectric converting device according to a third embodiment of the present invention when viewed from the main scanning direction. This embodiment is characterized in that the guide means according to the first embodiment is made of a light shielding material and that a light shielding guide means is provided on the original sheet discharge side.

A light shielding guide means 10 is secured to the edge of the light transmissive sensor substrate 1 and that of the protection layer 2. Therefore, unnecessary external light Lx made incident upon the original sheet supply side and the discharge side and illuminating the photoelectric converting element array through the edge of the light transmissive sensor substrate 1 and that of the protection layer 2 can be stopped considerably so that the S/N ratio can be maintained effectively.

If the width of the light transmissive sensor substrate 1 is reduced for the purpose of reducing the overall size and cost, the edge of the photoelectric converting element array and that of the light transmissive sensor substrate 1 come in closer to each other. Therefore, the quantity of stray light Ly illuminating the edge of the light transmissive sensor substrate 1 is increased in the illumination light L emitted from the light source 4. As a result, light reflected by the edge illuminates the photoelectric converting element array, causing the S/N ratio to deteriorate.

According to this embodiment, another effect can be obtained in that a portion of the illumination light L is reflected by the edge of the light transmissive sensor substrate 1 so that the quantity of the stray light Ly which illuminates the photoelectric converting element array is reduced so that the deterioration in the S/N ratio is prevented.

The light shielding guide means 10 can be manufactured by mixing pigment into the above-described organic material or by coloring the above-described organic material by a dyestuff.

Figure 6:
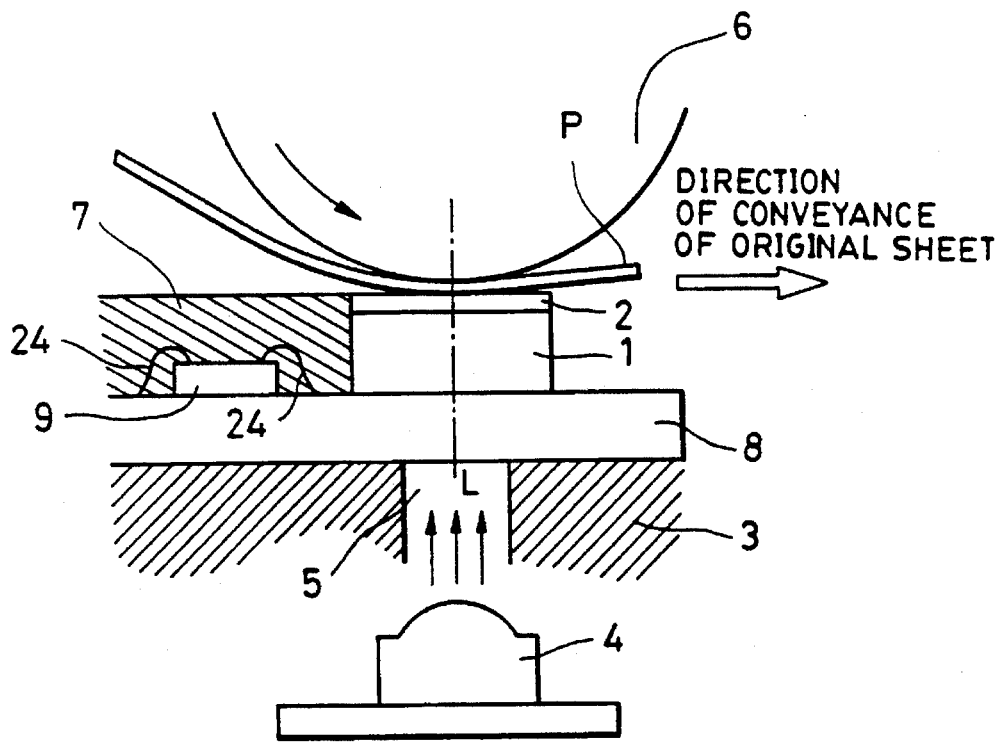
FIG. 6 is a schematic cross sectional view which illustrates a fourth embodiment of the photoelectric converting device according to the present invention.

FIG. 6 is a schematic cross sectional view which illustrates the photoelectric converting element array of the photoelectric converting device according to a fourth embodiment of the present invention when viewed from the main scanning direction. This embodiment is characterized in that the guide means also acts to seal an integrated circuit or an electrical connection means. The light transmissive sensor substrate 1 is formed on a light transmissive circuit substrate 8 having an integrated circuit 9 for operating the photoelectric converting element array or an electrical connection means 24 such as wire bonding. The guide means 7 also acts to seal the integrated circuit 9 or the electrical connection means 24 for the purpose of protecting it.

According to this embodiment, a sealing process necessary in the conventional technology can be performed in the same process in which the guide means is formed. Therefore, the number of the manufacturing processes can be eliminated.

The guide means of the photoelectric converting device according to the present invention can be manufactured by steps depicted in FIGS. 7(a) to 7(g). Then, the manufacturing method will be described with reference to the structure according to the third embodiment of the present invention shown in FIG. 5.

Figure 7A:
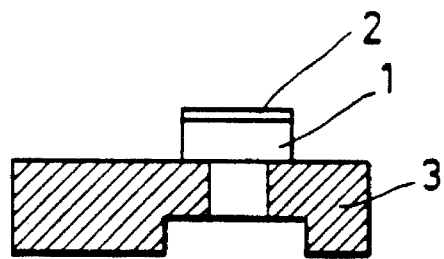
FIGS. 7(a) to 7(g) are schematic views which illustrate a method of manufacturing the photoelectric converting device according to the present invention.

(1) The photoelectric converting element (omitted from illustration) is formed by a semiconductor manufacturing process and the light transmissive sensor substrate 1 manufactured by placing the transparent protection layer 2 on the photoelectric converting element is secured to the base plate 3 (FIG. 7A).

Figure 7B:
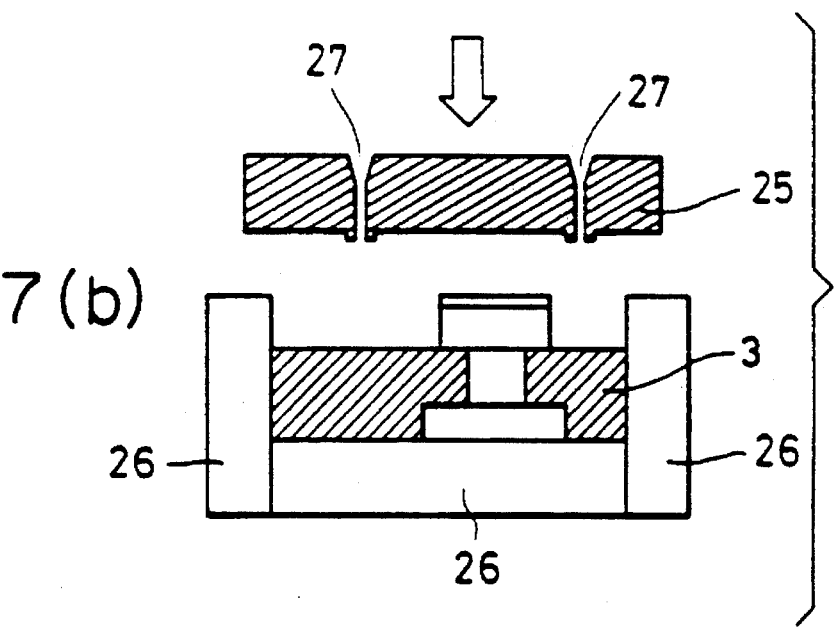

(2) The base plate 3 is fastened to a support member 26 (FIG. 7B).

Figure 7C:
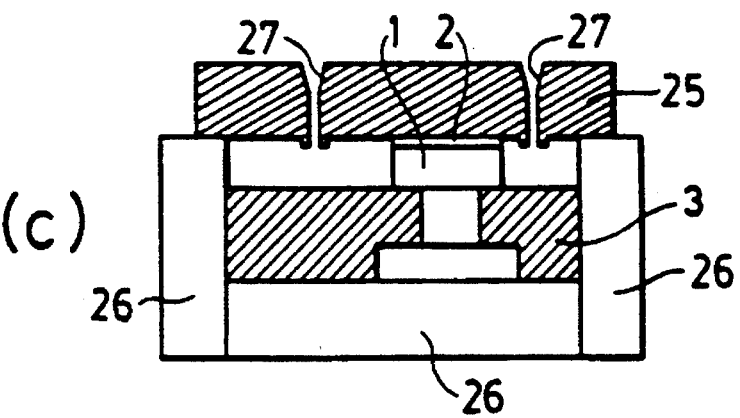

(3) A mold 25 for forming the guide means is fastened in such a manner that it directly comes in contact with the surface of the transparent protection layer 2 on the light transmissive sensor substrate 1 (FIG. 7C). The above-described process is provided for the purpose of continuously forming the guide means from the surface of the protection layer 2 while making the surface of the transparent protection layer 2 on the light transmissive sensor substrate 1 to be a reference surface.

The mold 25 has an injection port 27 through which a material for manufacturing the guide means is injected.

Since the material for forming the mold 25 must have elasticity and mold release characteristics, it is preferable to employ silicone or rubber. The reason for the necessity of the elasticity lies in that the surface of the transparent protection layer 2 must be protected from a damage and the flatness of the light transmissive sensor substrate 1 must be absorbed.

Figure 7D:
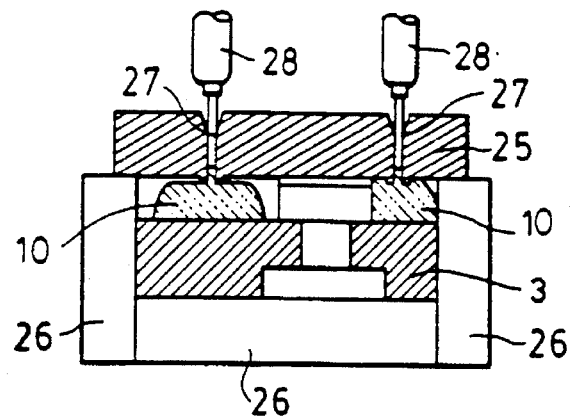

(4) A material 10 for forming the guide means is, by using an injector 28, for example, a dispenser, injected into a space defined by the mold 25, the base plate 3, the light transmissive sensor substrate 1 and the support member 26 through the injection port 27 formed in the mold 25 for forming the guide means (FIG. 7D).

Figure 7E:
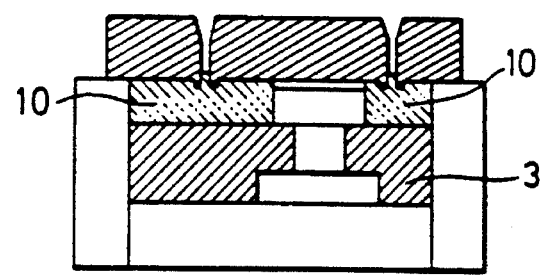

(5) The material 10 is hardened after it has been injected (FIG. 7E).

Figure 7F:
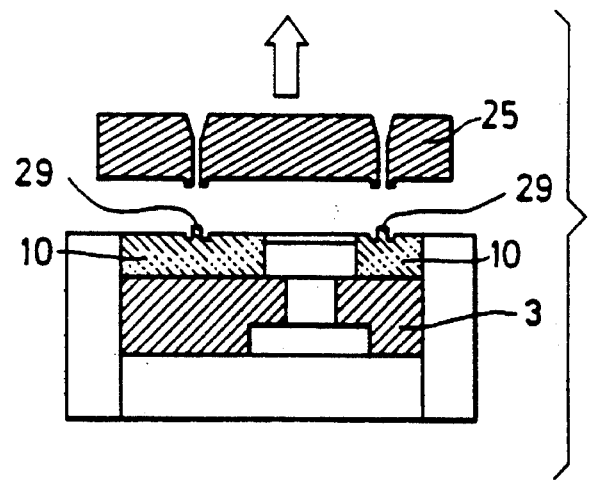

(6) The mold 25 is released after the material 10 has been hardened (FIG. 7F). At this time, burrs 29 are formed due to an influence of the injection port 27.

Figure 7G:
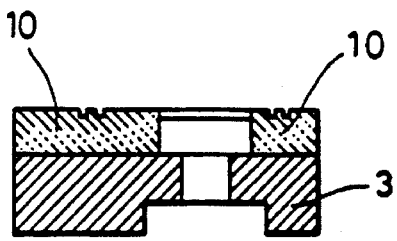

(7) The burrs 29 are removed so that the guide means 10 of the photoelectric converting device is manufactured (FIG. 7G).

Although the injection port 27 is formed in the mold 25 according to this embodiment, it may be formed in the support member 26.

FIG. 8 is a schematic cross sectional view which illustrates the light transmissive sensor substrate according to the embodiments shown in FIGS. 3 to 6 when viewed from the main scanning direction of the photoelectric converting element array.

A matrix circuit portion 12, an illumination opening 13, a photoelectric converting element 14, a charge storage portion 15 and a thin-film transistor (TFT) 16 for transferring the stored charge at a proper timing are formed on a glass substrate 11 having the light transmission characteristics.

The above-described devices are formed on the glass substrate 11 by successively layering a lower light-shielding electrode 17 made of Cr, an insulating layer 18 made of SiN, a photoelectric semiconductor layer 19 made of a-Si:H, an ohmic contact layer 20 made of n+a-Si:H and an upper electrode 21 made of Al, the above-described devices being formed by the same manufacturing process.

The photoelectric converting element 14, the charge storage portion 15 and the TFT Portion 16 are covered with a passivation layer 22 made of SiN. The protection layer 2 made of a thin glass plate is, via an adhesion layer 23, formed on the passivation layer 22.

The thin glass plate 2 serves as a wear resistance layer acting to protect the photoelectric converting element 14 or the like from The abrasion with the original sheet P and as a spacer acting to maintaining the distance between the original sheet P and the photoelectric converting element 14.

In the structure constituted as described above, illumination light L emitted from the light source 4 formed on the light transmissive sensor substrate 1 on the side opposing the original sheet P illuminates the original sheet P after it has passed through the light transmissive sensor substrate 1. Information light L' reflected by the surface of the original sheet P is received by the photoelectric converting device 14.

Figure 9:
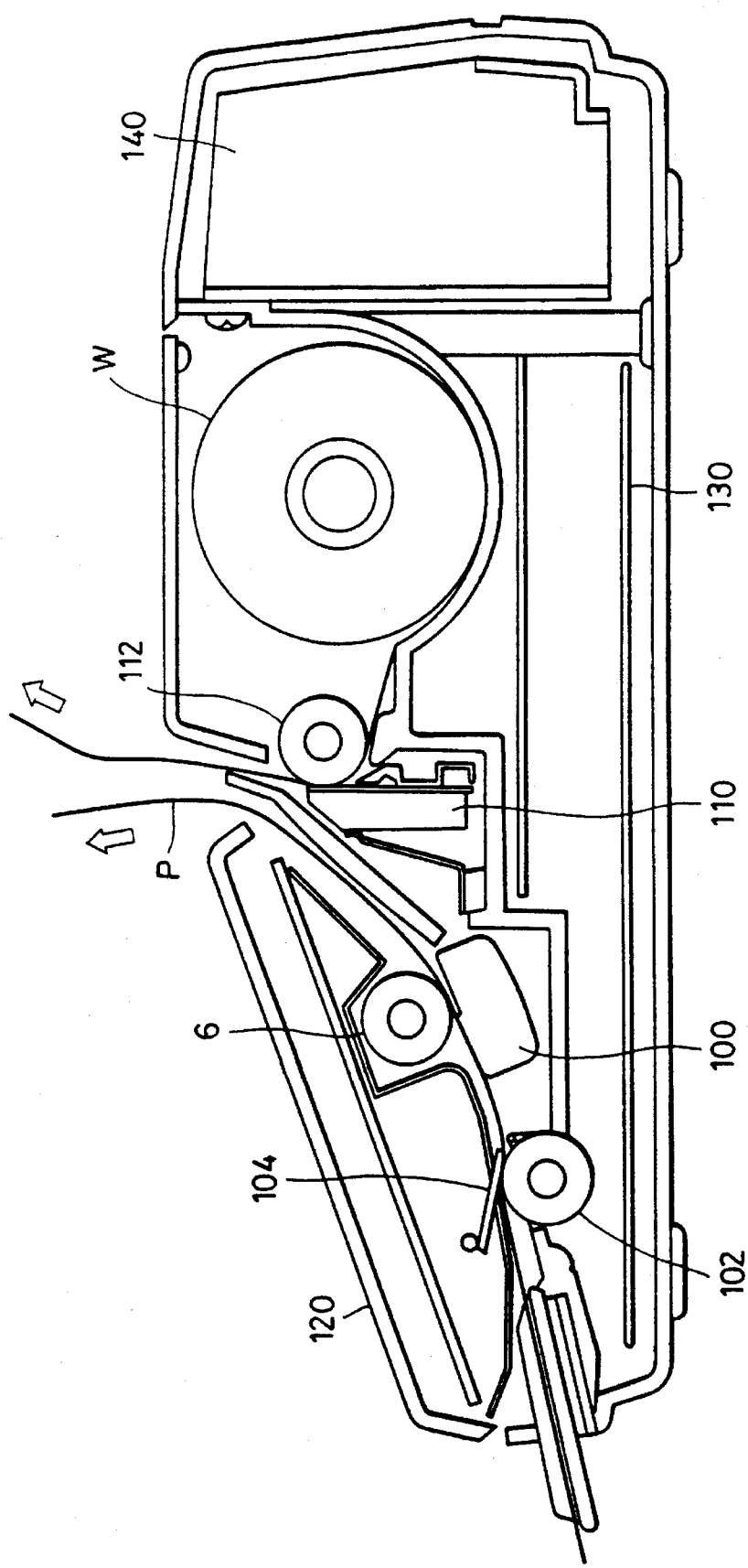
FIG. 9 is a schematic cross sectional view which illustrates an image processing apparatus to which the present invention can be applied.

FIG. 9 illustrates an example of an image processing apparatus (for example, a facsimile machine) constituted by using the photoelectric converting device according to the present invention.

Reference numeral 102 represents a feeding roller for feeding the original sheet P toward the reading position and 104 represents a separation member for assuredly separating and successively conveying the original sheets P. Reference numeral 6 represents the conveyance roller disposed at the reading portion of the photoelectric converting device 100, acting to restrict the surface of the original sheet P to be read and conveying the original sheet P.

Symbol W represents a recording medium in the form of a roll paper on which image information is formed, the image information being information read by the photoelectric converting device 100 or image information supplied from outside in the case where the image processing apparatus is a facsimile machine. Reference numeral 110 represents a recording head for forming the image. According to the present invention, it may be a recording head selected from a variety of types such as the thermal head and an ink jet recording head. The recording head may be a recording head of a serial type or a line type. Reference numeral 112 represents a platen roller for conveying the recording medium W to the position at which recording is performed by the recording head 110 and restricting the surface of the recording medium W on which information is recorded.

Reference numeral 120 represents an operation panel having switches through which an operation command is inputted and display portions on which a message and a state of the apparatus and the like are displayed.

Reference numeral 130 represents a system control substrate having, on the surface thereof, a control portion for controlling the overall system, a circuit for operating the photoelectric converting element, a portion for processing the image information and a portion for transmitting/receiving signals. Reference numeral 140 represents a power source of the apparatus.

The structures according to the above-described first to fourth embodiments were respectively applied to the apparatus shown in FIG. 9 so as to perform actual reading. As a result, an image could extremely stably be read without occurrence of a jam in any of the combinations.

In particular, an image could be further stably read in the third embodiment while preventing an excessive light incidence upon the sensor.

Figure 10:
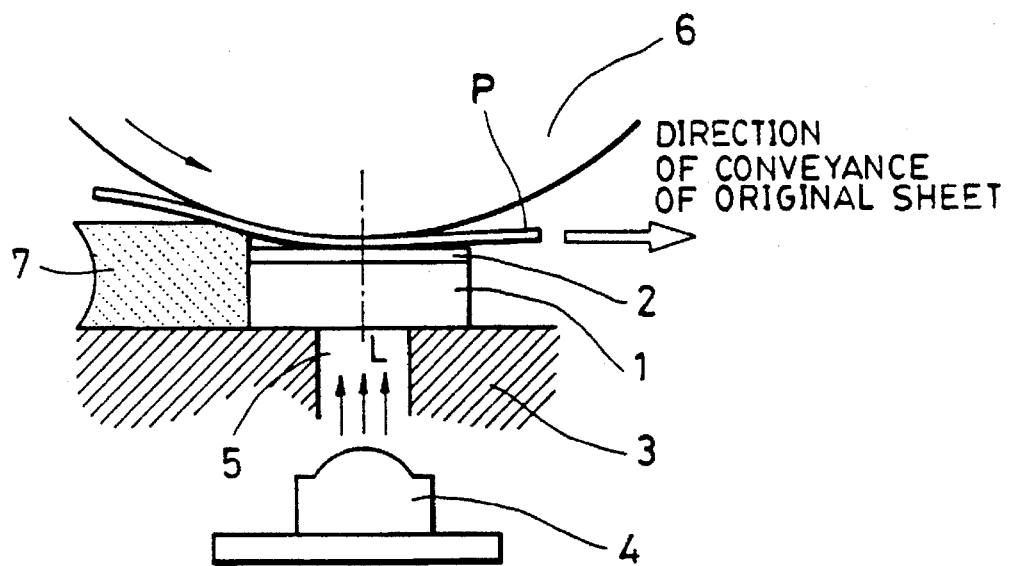
FIG. 10 is a schematic cross sectional view which illustrates a fifth embodiment of the photoelectric converting device according to the present invention.

FIG. 10 is a schematic cross sectional view which illustrates the light transmission converting element array of the photoelectric converting device according to a fifth embodiment of the present invention when viewed from the main scanning direction of the photoelectric converting element array.

Reference numeral 1 represents a light transmissive sensor substrate having a photoelectric converting element array (omitted from illustration) formed by a semiconductor manufacturing process on a substrate made of quartz glass or borosilicate glass having light transmission characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into directly contact with the protection layer 2.

As a result of the structure thus arranged, the illumination light L emitted from the light source 4 passes through the opening 5 formed in the base plate 3 and the light transmissive sensor substrate 1 before it illuminates the original sheet P. Information light L' reflected from the surface of the original sheet P is made incident upon the photoelectric converting element (omitted form illustration) formed on the light transmissive sensor substrate 1 before an image signal is transmitted from the photoelectric converting element.

A guide means 7 for conveying the original sheet P is disposed on the light transmissive sensor substrate 1 on the original-sheet supply side opposing the original-sheet conveyance direction in such a manner that the guide means 7 made of a flexible material and acting to convey the original sheet P is positioned in contact with the light transmissive sensor substrate 1.

In a structure in which the guide means 7 is made of a flexible material, the burrs formed at the edge of the light transmissive sensor substrate 1 can be absorbed thanks to the flexibility of the guide means even if the light transmissive sensor substrate 1 and the guide means 7 are brought into contact with each other. Therefore, the conventional necessity of providing a gap between the light transmissive sensor substrate 1 and the guide means 7 can be eliminated.

In a structure in which the guide means 7 is made of a flexible material, it can be easily deformed by the pressure of the conveyance roller 6 even if the height of the guide means 7 which comes in contact with the original sheet P is made larger than the height of the protection layer 2 of the light transmissive sensor substrate 1 which comes in contact with the original sheet P. As a result, the depth of field can easily be maintained.

It is preferable that an organic material be employed to manufacture the guide means 7. For example, a flexible material such as a sponge which is a porous material and rubber may be employed. In addition, a material such as polycarbonate and an ABS resin given flexibility due to a forming work may be employed.

As a result of the structure in which the guide means is made of a flexible material, forming of the gap into which the front end portion of the original sheet P can be introduced can be prevented between the light transmissive sensor substrate and the guide means. Therefore, a jam of a type in which the front end portion of the original sheet is introduced into the gap can be assuredly prevented. Furthermore, since forming of an excessively large step can be prevented between the protection layer of the light transmissive sensor substrate and the guide means, the deterioration in the S/N ratio can be prevented regardless of the thickness of the paper.

Figure 11:
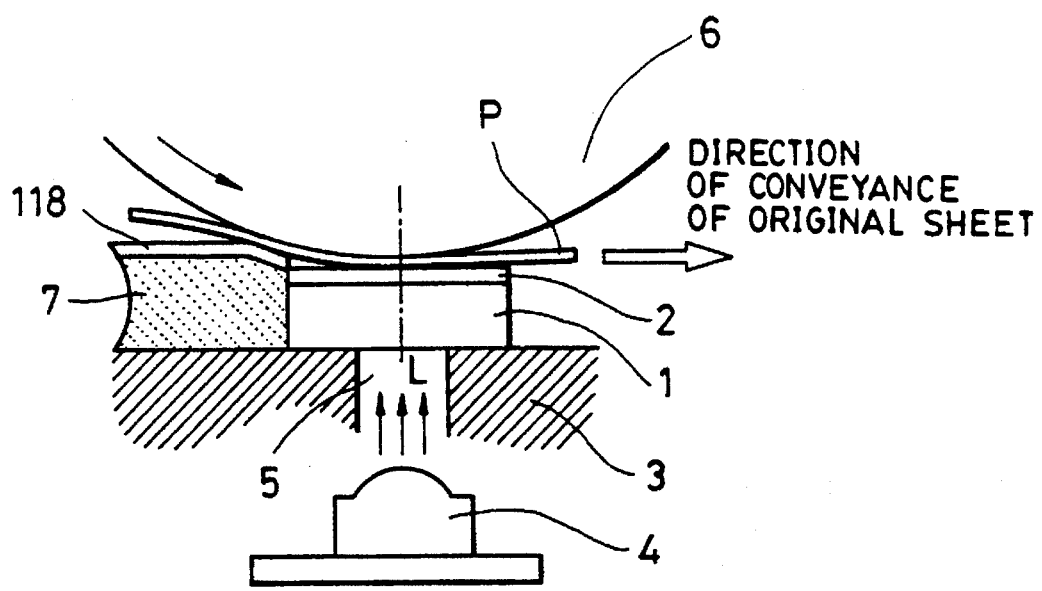
FIG. 11 is a schematic cross sectional view which illustrates a sixth embodiment of the photoelectric converting device according to the present invention.

FIG. 11 is a schematic cross sectional view which illustrates the light transmission converting element array of the photoelectric converting device according to a sixth embodiment of the present invention when viewed from the main scanning direction of the photoelectric converting element array. The difference between this embodiment and the fifth embodiment lies in that the guide means according to the fifth embodiment shown in FIG. 10 is given electric conductivity. The structure shown in FIG. 10 is arranged in such a manner that the original-sheet conveying side of the surface of the guide means 7 is arranged to be electrically conductive. According to this embodiment, an electrically conductive layer 118 is formed on the original sheet conveying side of the guide means 7 which is made of a flexible material while maintaining the electric potential of the electrically conductive layer 118.

Facsimiles, image readers, digital copying machines and electronic blackboards of the type which employ the photoelectric converting device according to the present invention must be arranged in such a manner that the electric circuits provided therein are protected from the static electricity generated during the conveyance of a original sheet. Therefore, an electricity removing brush has been employed.

The electrically conductive layer 118 provided for the guide means according to this embodiment exhibits an effect of reducing the generation of the static electricity generated during the conveyance of an original sheet and thereby protecting the electric circuits provided in the apparatus. As a result, the necessity of providing the electricity removing brush can be eliminated. Another effect will be obtained in that the photoelectric converting device and ICs disposed surrounding the photoelectric converting element are shielded from the static electricity.

The electrically conductive layer 118 can be formed by printing, evaporating or plating ITO, Al, Ni or carbon or the like on a flexible material.

The removal of the static electricity generated during the conveyance of an original sheet will also effectively prevent a jam of the original sheet.

Although electric conductivity is given to the surface of the guide means according to this embodiment, the present invention is not limited to this. The overall body of the guide means may have the electric conductivity.

Figure 12:
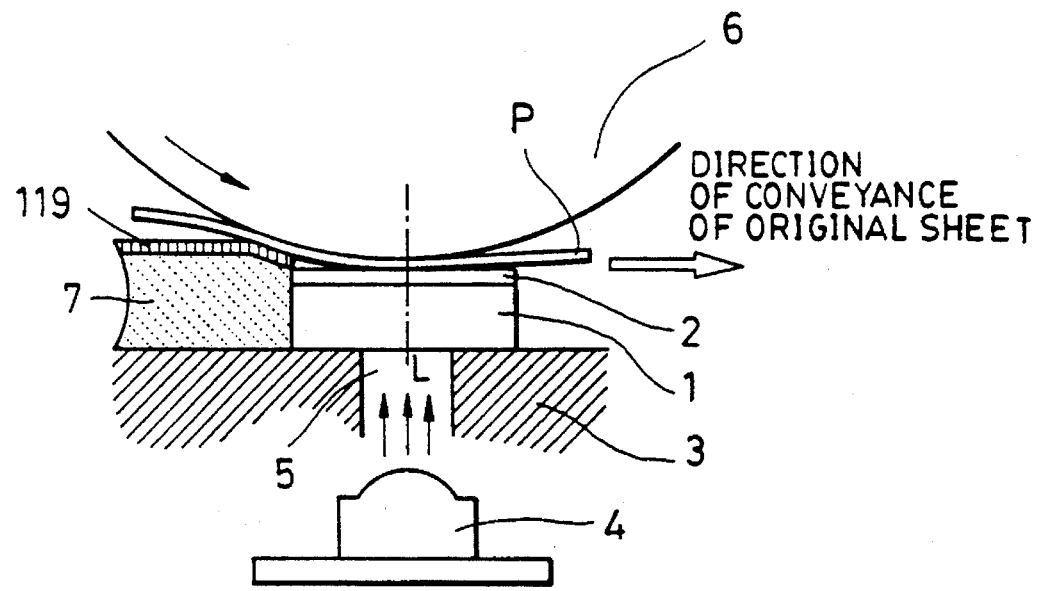
FIG. 12 is a schematic cross sectional view which illustrates a seventh embodiment of the photoelectric converting device according to the present invention.

FIG. 12 is a schematic cross sectional view which illustrates the light transmission converting element array of the photoelectric converting device according to a seventh embodiment of the present invention when viewed from the main scanning direction of the photoelectric converting element array. The difference between this embodiment and the fifth embodiment lies in that a low frictional layer is formed on the original sheet conveying side of the guide means according to the fifth embodiment shown in FIG. 10.

A low frictional layer 119 reveals an effect of stably conveying an original sheet by reducing the friction acting between the original sheet P and the guide means.

As the material for manufacturing the low frictional layer 119, a material such as Teflon and polyethylene or the like displaying a small friction coefficient with an original sheet.

Figure 13:
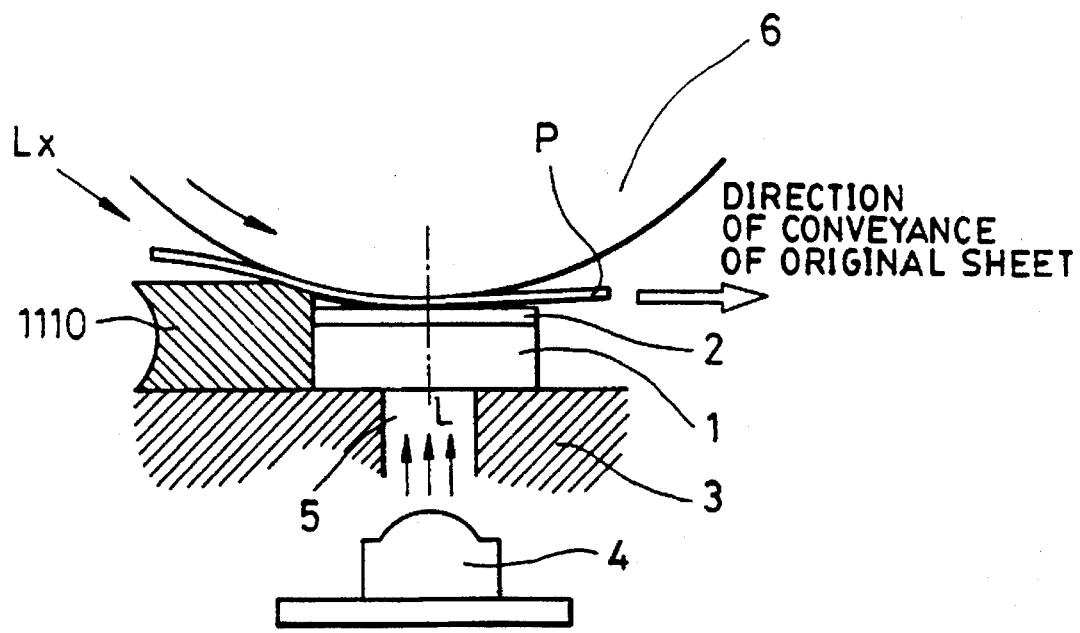
FIG. 13 is a schematic cross sectional view which illustrates an eighth embodiment of the photoelectric converting device according to the present invention.

FIG. 13 is a schematic cross sectional view which illustrates the light transmission converting element array of the photoelectric converting device according to an eighth embodiment of the present invention when viewed from the main scanning direction of the photoelectric converting element array. The difference between this embodiment and the fifth embodiment shown in FIG. 10 lies in that the guide means according to the fifth embodiment is made of a light shielding member.

A light shielding guide means 1110 reveals an effect of maintaining the S/N ratio by reducing the quantity of external light Lx which has been made incident upon through the original sheet supply side and capable of illuminating the light ] sensor substrate 1. The reason for this lies in that the incidence of light, which illuminates the photoelectric converting element, through the edge of the light transmissive sensor substrate 1 is prevented.

The schematic cross sectional view which illustrates the light transmissive sensor substrate according to this embodiment of the present invention when viewed from the main scanning direction of the photoelectric converting element array can be applied to FIGS. 10, 11, 12 and 13.

Since the description about the structure shown in FIG. 8 has been made above, it is omitted here.

The structures according to the above-described fifth to eighth embodiments were respectively applied to the apparatus shown in FIG. 9 so as to perform actual reading. As a result, an image could extremely stably be read without occurrence of a jam in any of the combinations. In particular, an image could be further stably read in the fourth embodiment since the incidence of an excessive external light made upon the sensor could be prevented.

Figure 14:
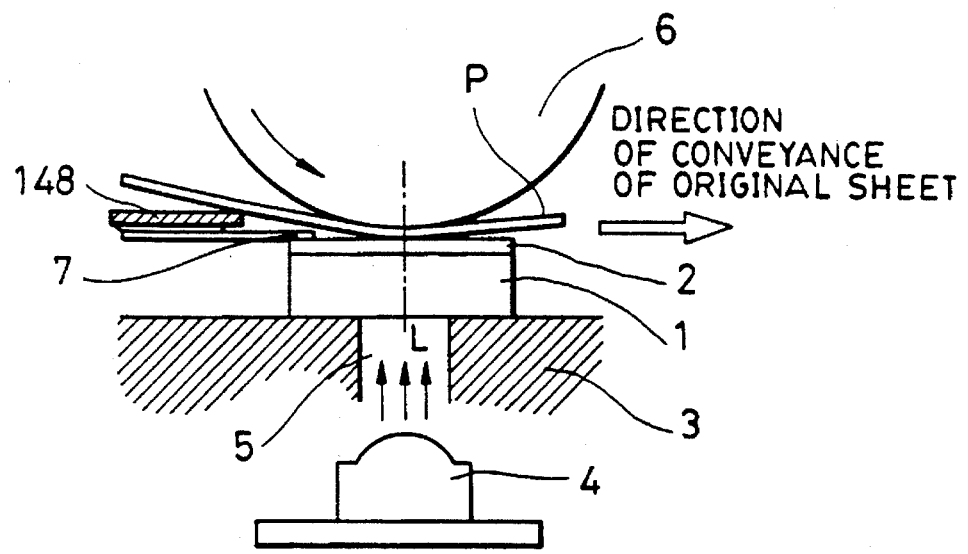
FIG. 14 is a schematic cross sectional view which illustrates a ninth embodiment of the photoelectric converting device according to the present invention.

FIG. 14 is a schematic cross sectional view which illustrates the light transmission converting element array of the photoelectric converting device according to a ninth embodiment of the present invention when viewed from the main scanning direction of the photoelectric converting element array.

Reference numeral 1 represents a light transmissive sensor substrate having a photoelectric converting element array (omitted from illustration) formed by a semiconductor manufacturing process on a substrate made of quartz glass or borosilicate glass having light transmission characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into directly contact with the protection layer 2.

As a result of the structure thus arranged, the illumination light L emitted from the light source 4 passes through the opening 5 formed in the base plate 3 and the light transmissive sensor substrate I before it illuminates the original sheet P. Information light L' reflected from the surface of the original sheet P is made incident upon the photoelectric converting element (omitted form illustration) formed on the light transmissive sensor substrate 1 before an image signal is transmitted from the photoelectric converting device.

A guide means 7 for conveying the original sheet P is disposed on the light transmissive sensor substrate 1 on the original-sheet supply side opposing the original-sheet conveyance direction.

The guide means 7 is disposed in such a manner that it extends over the surface of the protection layer 2 of the light transmissive sensor substrate 1 on which it does not come in contact with the conveyance roller 6, the guide means 7 being secured by a guide support member 148 by bonding, forcible fitting or screw fixing.

Therefore, although the width of the light transmissive sensor substrate is arranged to be small, the space through which the original sheet P is conveyed can be satisfactorily enlarged. Furthermore, the gap into which the front portion of the original is introduced cannot be formed between the light transmissive sensor substrate and the guide means. Therefore, a jam which is taken place in the conventional photoelectric converting device shown in FIG. 1 and which is due to the introduction of the original sheet into the gap formed between the sensor substrate and the guide means can be prevented. Simultaneously, the protection layer of the light transmissive sensor substrate and the guide means are individually formed so that the conveyance roller does not come in contact with the guide means. Therefore, large frictional force does not act on the guide means. Therefore, the deterioration in the S/N ratio in the conventional photoelectric converting device shown in FIG. 2 due to the damage or an adhesion of dust to the film can be prevented.

It is preferable that the guide means 7 be made of a flexible material such as an organic film made of, for example, Teflon, PET, PEEK, PC and nylon. In a structure in which the guide means 7 is made of the flexible material, the contour of the guide means is able to correspond to the shape of the protection layer, causing the assembling accuracy to be absorbed. Furthermore, if an original sheet having a large thickness is desired to be read, floating of the original sheet can be satisfactorily prevented.

In a case where the guide means is made of a thin plate member, there is a fear in that the surface of the protection layer of the light transmissive sensor substrate is damaged by burrs formed at the edge of the plate member. However, if such burrs can be sufficiently prevented, a plate member such as a thin metal plate and/or a thin plastic plate may be employed. Another structure may be employed which is arranged in such a manner that an organic film of the type described above is provided for the above-described plate member.

Although the thickness of the guide means 7 is determined depending upon the positional relationship with the conveyance roller 6, it is preferable that the thickness be 0.3 mm or less.

As described above, the guide means for conveying an original sheet is arranged to extend on the surface of the protection layer in a portion in which it does not come in contact with the conveyance roller. Therefore, the reduction in the space through which the original sheet is conveyed can be prevented so that the jam of the original sheet is prevented. Simultaneously, the adhesion of dust which will deteriorate the S/N ratio can be prevented. As a result, the overall cost and the size of the photoelectric converting device can further be reduced.

Figure 15:
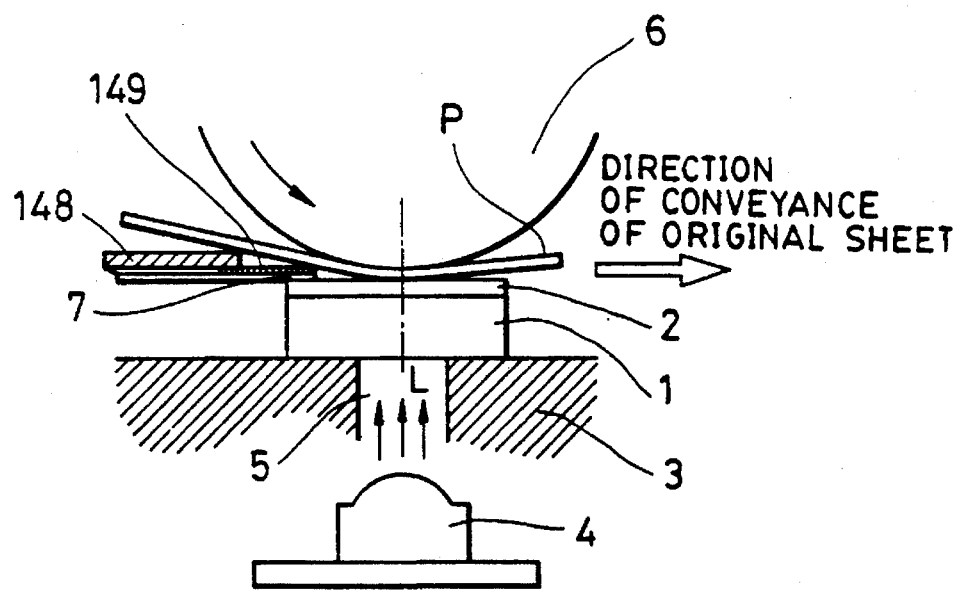
FIG. 15 is a schematic cross sectional view which illustrates a tenth embodiment of the photoelectric converting device according to the present invention.

FIG. 15 is a schematic cross sectional view which illustrates the light transmission converting element array of the photoelectric converting device according to a tenth embodiment of the present invention when viewed from the main scanning direction of the photoelectric converting element array. The difference between this embodiment and the ninth embodiment shown in FIG. 9 lies in that the original sheet conveying side of the guide means according to the ninth embodiment shown in FIG. 14 is given electric conductivity.

An electrically conductive layer 149 is formed on the original sheet conveying side of the surface of the guide means 7 made of a flexible material such as an organic film. Furthermore, the potential of the electrically conductive layer 149 is maintained at a constant level.

Facsimiles, image readers, digital copying machines and electronic blackboards of the type which employ the photoelectric converting device according to the present invention must be arranged in such a manner that the electric circuits provided therein are protected from the static electricity generated during the conveyance of a original sheet. Therefore, an electricity removing brush has been employed.

The electrically conductive layer 149 provided for the guide means according to this embodiment exhibits an effect of reducing the generation of the static electricity generated during the conveyance of an original sheet and thereby protecting the electric circuits provided in the apparatus. As a result, the necessity of providing the electricity removing brush can be eliminated. Another effect will be obtained in that the photoelectric converting device and ICs disposed surrounding the photoelectric converting element are shielded from the static electricity.

Similarly to the sixth embodiment, the jam of an original sheet due to the static electricity can also be effectively prevented.

The electrically conductive layer 118 can be formed by printing, evaporating or plating an electric conductive material such as ITO, Al, Ni or carbon or the like on an organic film.

Although the electric conductivity is given to the surface of the guide means according to this embodiment, the present invention is not limited to this. Another structure may be employed in which the overall body of the guide means has the electric conductivity.

In the case where the electric conductive layer 149 has light shielding characteristics (for example, metal), the S/N ratio can be improved against the stray light to be described later.

Figure 16:
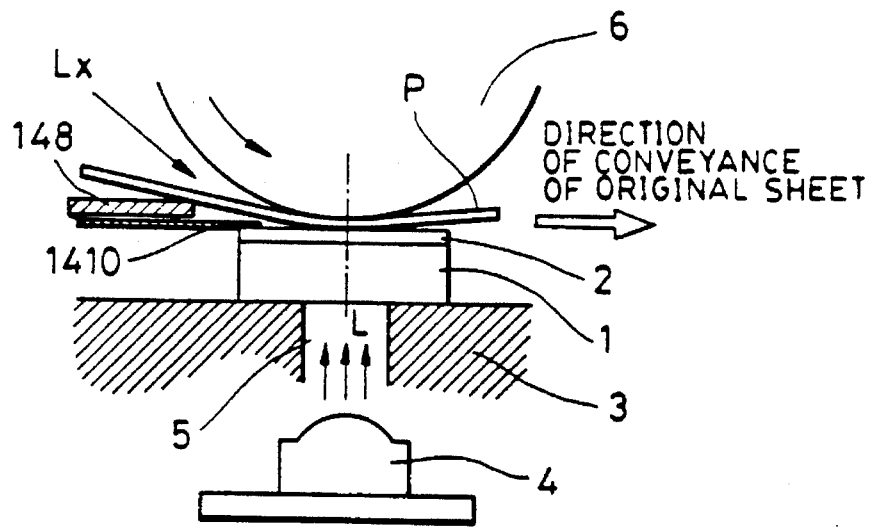
FIG. 16 is a schematic cross sectional view which illustrates an eleventh embodiment of the photoelectric converting device according to the present invention.

FIG. 16 is a schematic cross sectional view which illustrates the light transmission converting element array of the photoelectric converting device according to an eleventh embodiment of the present invention when viewed from the main scanning direction of the photoelectric converting element array. The difference between this embodiment and the ninth embodiment shown in FIG. 14 lies in that the guide means according to the ninth embodiment shown in FIG. 14 is made of a light shielding material.

The guide means 1410 having the light shielding characteristics is arranged to extend on the surface of the protection layer 2 in a portion in which it does not come in contact with the conveyance roller 6. Therefore, an effect can be obtained in that unnecessary external light Lx made incident upon the original sheet supply side and illuminating the light transmissive sensor substrate can be stopped considerably so that the S/N ratio can be maintained. The reason for this lines in that the incidence of light made upon, for example, the edge of the light transmissive sensor substrate 1 is prevented and the photoelectric converting element or the like can be prevented from the light. The guide means 1410 may, of course, be structured in such a manner that it has the light shielding member on the surface thereof or includes the same. The light shielding characteristics can also be obtained by modifying the method according to the third embodiment. The schematic cross sectional view which illustrates the light transmissive sensor substrate according to this embodiment when viewed in the main scanning direction of the photoelectric converting element array can be applied to FIGS. 14, 15 and 16.

Since the description about the structure shown in FIG. 8 has been made above, it is omitted here.

The guide member according to the above-described ninth to eleventh embodiments were respectively applied to the apparatus shown in FIG. 9 so as to perform actual reading. As a result, an image could extremely stably be read without occurrence of a jam in any of the combinations. In particular, an image could be further stably read in the eleventh embodiment while preventing an excessive light incidence.

The above-described embodiments may be combined optionally in accordance with the necessity. For example, a structure may be employed which is arranged in such a manner that the original sheet guide is, as described above, continuously formed and as well as the thus formed original sheet guide is made of a flexible material. Another structure may be employed which is arranged in such a manner that the original sheet guide is made of a flexible material and as well as a guide made of a film is provided. Another structure may be employed which is arranged in such a manner that the original sheet guide is arranged to be a guide made of a film which can be compressively deformed.

Another structure may be employed which is arranged in such a manner that the original sheet guide is, as described above, continuously formed and as well as the above-described guide made of a film is provided.

If necessary, other combinations may be employed. However, it is preferable that the above-described examples be individually employed in terms of preventing an increase in the overall cost and a labor necessary to manufacture it.

As an output method which can be applied to the image processing apparatus or the like shown in FIG. 9, a thermal transfer recording method or a thermal sensitive recording method in which the thermal head is, as described above, employed or an ink jet recording method in which an ink jet recording head is employed may be employed.

The present invention brings about excellent effects particularly in a recording head of the bubble jet system suggested by Canon Inc. among the ink jet recording system.

As to its representative constitution and principle, for example, one practiced by use of the basic principle disclosed in, for example, U.S. Pat. Nos. 4,723,129 and 4,740,796 is preferred. The above-described system can be applied to either the so-called on-demand type and the continuous type. In particular, it is effective to combine it with the on-demand type in such a manner that at least one driving signal is supplied to electricity-heat convertors disposed to correspond to the sheet or a liquid passage in which liquid (ink) is held, the driving signal corresponding to information to be recorded and causing a rapid temperature rise which exceeds the nuclear boiling. The reason for this lies in that thermal energy, which is able to cause film boiling to be generated in the heat acting surface of the recording head, can be generated in the electricity-heat converters and thereby bubbles in the liquid (ink) can be formed to correspond to the above-described driving signals. The liquid (ink) is discharged through a discharging opening in accordance with the growth and the shrinkage of the bubble. As a result, at least one droplet is formed. In the case where the above-described driving signal is arranged to be in the form of a pulse shape, the growth/shrinkage of the bubbles can be quickly and properly conducted. Therefore, a further satisfactory effect can be obtained in that the liquid can be discharged while exhibiting an extremely excellent responsibility. As a pulse driving signal of the type described above, it is preferable that a driving signal disclosed in U.S. Pat. No. 4,463,359 and another one disclosed in U.S. Pat. No. 4,345,262 be employed. In the case where the conditions disclosed in the specification of U.S. Pat. No. 4,313,124 which relates to an invention concerning the temperature rise of the above-described heat acting surface, further satisfactory recording can be performed.

As for the structure of the recording head, the structures disclosed in the above-described specifications arranged in such a manner that the discharge port, the liquid passage and the electricity-heat converter are combined (linear fluid path or a perpendicular fluid path) and another structure disclosed in U.S. Pat. No. 4,558,333 and U.S. Pat. No. 4,459,600 arranged in such a manner that the heat acting portion is disposed in a bent portion are included in the scope of the present invention. In addition, the present invention can be effective in the case where the structure according to the present invention is applied to a structure disclosed in Japanese Patent Laid-Open No. 59-123670 arranged in such a manner that a common slit is used as the discharge portion of the electricity-heat converter and to another structure disclosed in Japanese Patent Laid-Open No. 59-138461 arranged in such a manner that an opening for absorbing pressure wave of thermal energy is arranged to correspond to the discharge portion.

Furthermore, as the full-line type recording head having the length corresponding to the width of the maximum recording medium to which the recording device is able to record information, either a structure which is arranged in such a manner that the above-described length is satisfied by a combination of a plurality of recording heads of the type disclosed in the above-described recording heads and another structure in which the same is satisfied by an integrated recording head may be employed. In either case, the present invention is able to further effectively reveal the above-described effect.

In addition, the present invention is effective in a case where an exchangeable chip type recording head is employed which is capable of establishing the electrical connection with the apparatus body and the ink supply when it is loaded to the apparatus body. Furthermore, it is also effective in a case where a recording head of a cartridge type which is integrally provided for the recording head.

It is preferable to further stabilize the effect of the present invention that a recovery means and a preliminary auxiliary means be added, the recovery means and the preliminary auxiliary means being provided in the structure of the recording head according to the present invention. Specifically, it is effective to stably record information when combined with capping means, cleaning means, pressurization or suction means for the recording head and preliminary heating means constituted by combining these means. Furthermore, it is effective to perform a preliminary discharge mode which is the individual discharge operation from the discharge operation performed at the time of the recording.

The present invention is extremely effective when combined with a recording apparatus having a recording mode in which a main color such as black or the like is imaged and another recording apparatus capable of imaging a plurality of colors or full-color by a structure in which the plurality of recording heads are integrally constituted or combined.

Although liquid ink is employed in the above-described embodiments according to the present invention, ink which is a solid at room temperature and ink which is softened at room temperature may be employed. In the above-described ink jet recording apparatus, the temperature is usually controlled in such a manner that the temperature of ink is controlled in a range between 30° C. and 70° C. so as to make the viscosity of the ink suitable for it to be discharged. Therefore, the ink must be in the liquid form when a signal denoting the fact that the ink is used is supplied. In addition, ink which commences to be liquified can be employed in the structure according to the present invention, the ink being ink of a type which can be liquified and discharged in the form of liquid ink when thermal energy is given in accordance with a recording signal and ink of a type which commences to be solidified at the time it reaches the recording medium. The ink of these types are exemplified by the ink arranged in such a manner that the temperature rise due to the application of the thermal energy is prevented by utilizing this temperature rise as energy to change the phase of the ink from the solid phase to the liquid phase. Another ink is also exemplified which is arranged in such a manner that it is solidified when it is allowed to stand for the purpose of preventing the ink evaporation. In the above-described cases, the ink may be arranged in such a manner that it confronts the electricity-heat converter while being held in the form of liquid or a solid substance in a recessed portion or a through hole formed in a porous sheet as disclosed in Japanese Patent Laid-Open No. 54-56847 or Japanese Patent Laid-Open No. 60-71260. According to the present invention, it is most effective for the above-described ink that the above-described film boiling method be employed.

Then, the ink jet recording head which is used in the method in which liquid (ink) is discharged by utilizing thermal energy at the time of recording will briefly be described.

Figure 17:
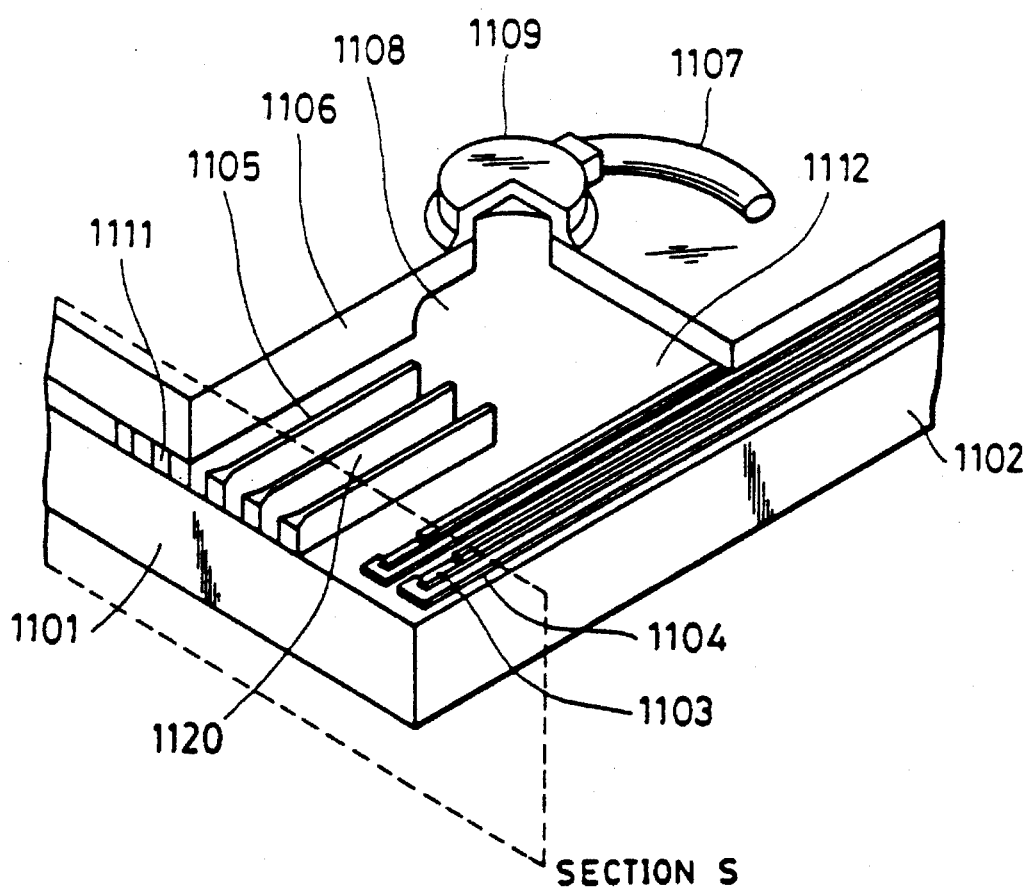
FIG. 17 is a schematic view which illustrates an ink jet recording head.

FIG. 17 is a schematic structural view of an example of an ink jet recording head of the type described above. Referring to FIG. 17, the ink jet recording head comprises a film-shape electricity-thermal converting means 1103 formed on a substrate 1102, an electrode 1104, a wall 1105 and a cover member 1106 each of which has been formed by a semiconductor manufacturing process such as etching, evaporation or sputtering. Recording liquid 1112 is supplied to a common liquid chamber 1108 disposed in the recording head 1101 from a liquid storage chamber (omitted from illustration) through a liquid supply pipe 1107. Reference numeral 1109 represents a connector for the liquid supply pipe 1107. The liquid 1112, which has been supplied to the common liquid chamber 1108, is supplied to a liquid path 1120 due to so-called capillarity before it forms meniscus at the discharge surface at the front portion of the liquid path 1110 (the orifice surface) so that it can be stably held. When electricity is supplied to the heat-thermal converting means 1103 at this time, the liquid 1112 is rapidly heated so that a bubble is formed in the liquid path 1110. As a result of the expansion and shrinkage of the bubble, the liquid 1112 is discharged through a discharge port 1111 so that a droplet is formed. A multi-nozzle or full line type ink jet recording head is thus constituted in which 128 or 256 discharge ports are densely disposed at a density of 16 nozzles/mm.

Then, an example of a structure in which a recording head of the type described above is used as output means of an image processing apparatus will be described. At this time, the description will be made about only the output portion.

Figure 18:
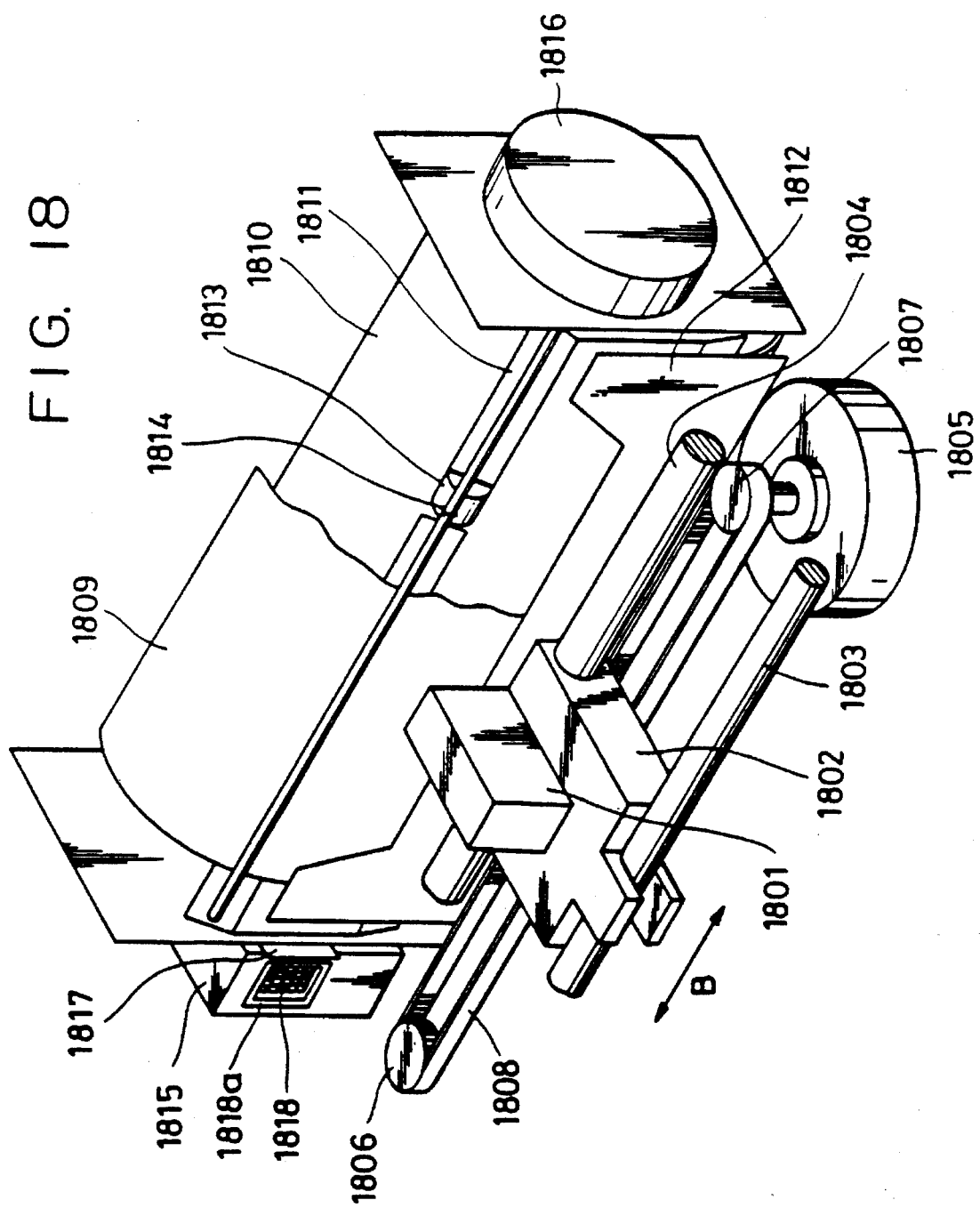
FIGS. 18 and 19 are schematic views which respectively illustrate an output portion which can be applied to an image processing apparatus according to the present invention.

FIG. 18 is a perspective view which illustrates the external structure of the output portion arranged to act in accordance with the ink jet recording system. Referring to FIG. 18, reference numeral 1801 represents an ink jet recording head (to be abbreviated to "recording head" hereinafter) for recording a desired image by discharging ink in accordance with a predetermined recording signal. Reference numeral 1802 represents a carriage for moving the recording head 1801, which performs the scanning operation, toward the recording line (in the main scanning direction). The carriage 1082 is slidably supported by guide shafts 1803 and 1804 so that it reciprocates in the main scanning direction in synchronization with the action of a timing belt 1808. The timing belt 1808 engaged with pulleys 1806 and 1807 is operated by a carriage motor 1805 via the pulley 1807.

A recording paper sheet 1809 is guided by a paper pan 1810 and is conveyed by a paper feeding roller (omitted from illustration) which is being pressed by a pinch roller, this conveyance of the recording paper sheet 1809 is being performed by a paper feeding motor 1816. The thus conveyed recording paper sheet 1809 is conveyed while being brought into closely contact with a heater 1811 since the recording paper sheet 1809 is being given a tension by a paper discharge roller 1813 and a spur 1814 and is pressed to the surface of the heater 1811 by a paper retaining plate 1812 made of an elastic material. The recording paper sheet 1809, to which ink jetted by the recording head 1801 has been adhered, is heated by the heater 1811 so that it is fixed to the recording paper sheet 1809 since the water content of the ink is evaporated.

Reference numeral 1815 represents a unit called a "recovery system" which acts to maintain the discharge characteristics at a normal state by removing foreign matters adhered to the discharge port (omitted from illustration) of the recording head 1801 or ink the viscosity of which has been raised excessively.

Reference numeral 1818a represents a cap composing of a portion of the recovery system unit 1815, the cap 1818a acting to ap the discharge port of the ink jet recording head 1801 so as to prevent clogging. It is preferable that the cap 1818a include an ink absorber 1818.

A cleaning blade 1817 is disposed on the recording side of the recovery system unit 1815. The cleaning blade 1817 is arranged to be brought into contact with the surface in which the discharge port of the recording head 1801 is formed so that the foreign matters and ink droplets adhered to the surface of the discharge port are cleaned up.

According to the present invention, an electric signal denoting the image information read by the photoelectric converting device is converted into an recording electric signal by the image processing means before the image information is recorded by the actions of the carriage motor, the paper feeding motor and the recovery device and the like controlled by a controller such as a CPU (Central Processing Unit).

Another structure may be employed which is arranged in such a manner that the electric signal denoting the above-described image information is transmitted to another image processing apparatus via a communication means and then output is performed from this image processing apparatus.

Figure 19:
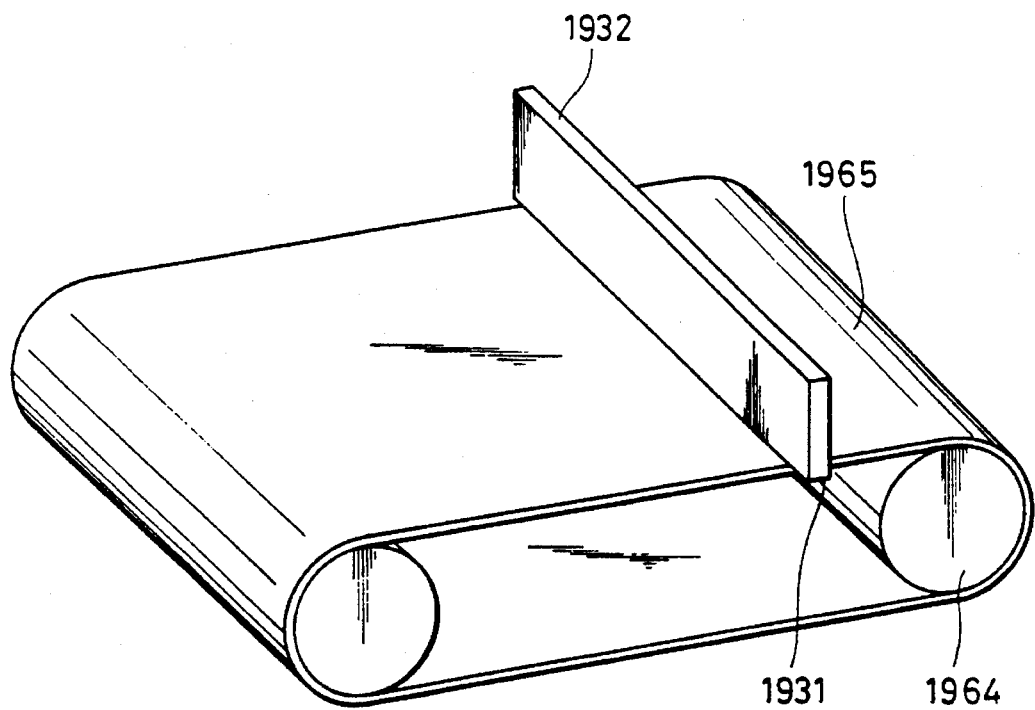

FIG. 19 is a schematic view which illustrates the output portion of a structure on which a full-line type ink jet recording head 1932 is mounted. Referring to FIG. 19, reference numeral 1965 represents a conveyance belt for conveying a recording medium (omitted from illustration), the conveying belt 1965 being arranged to convey the recording medium when a conveying roller 1964 is rotated. The lower surface of the ink jet recording head 1932 is made a discharge port surface 1931 in which a plurality of discharge ports are formed corresponding to the recording region of the recording medium.

Also in this case, recording can be performed similarly to the above-described serial type recording head.

The present invention is not limited to the description made about the output portion. It may be modified variously.

In the case where the above-described system is employed which is arranged in such a manner that thermal energy is utilized so as to discharge liquid, the overall size of the apparatus can be further reduced and as well as information can be further precisely recorded. Therefore, the effect of the present invention can be further improved and the performance of the image processing apparatus can thereby be improved.

Figure 20:
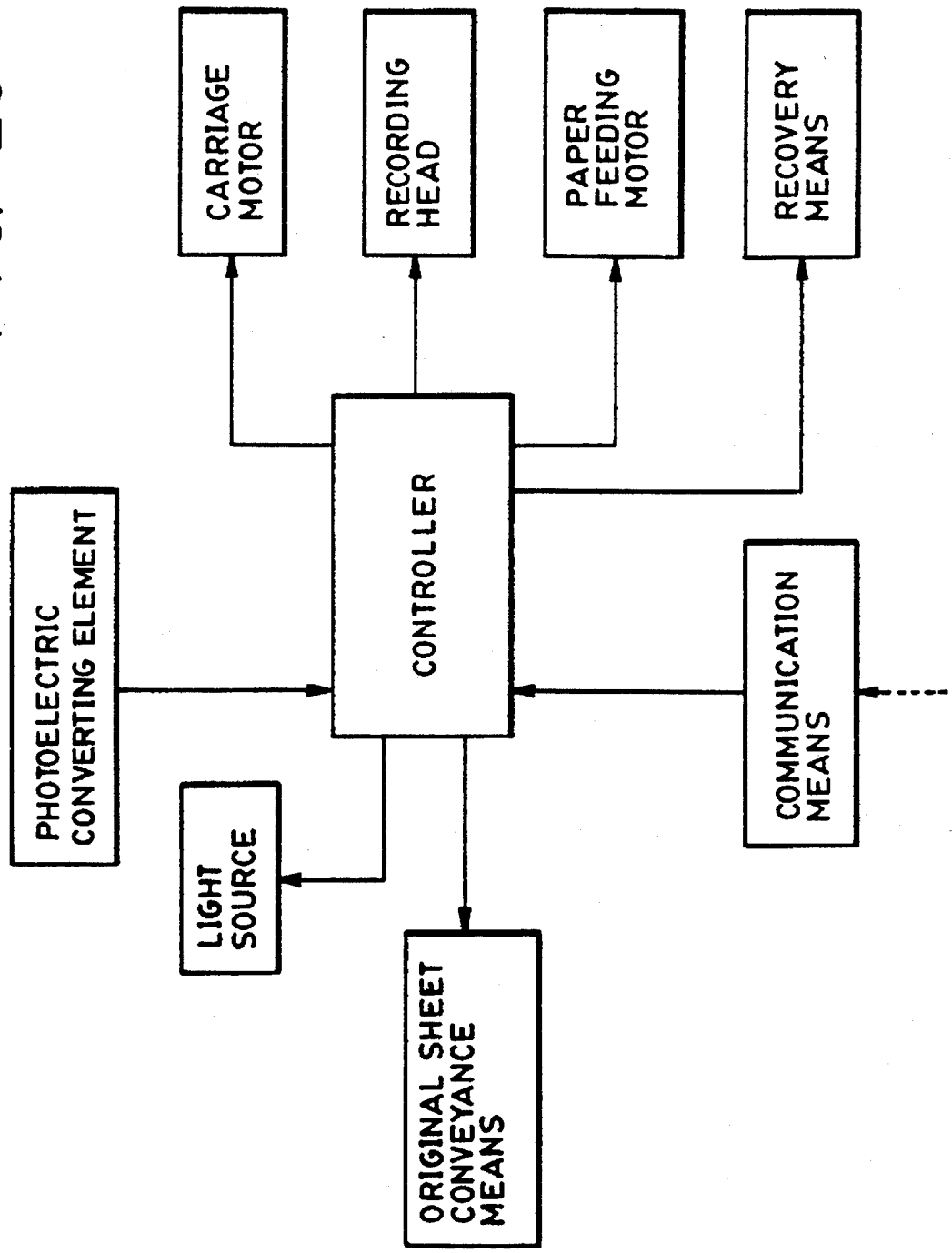
FIG. 20 is a block diagram which can be applied to the image processing apparatus according to the present invention.

FIG. 20 illustrates an example of a block diagram which can be applied to an image processing apparatus according to the present invention.

As described above, according to the present invention, a problem such as a jam taken place in that an original sheet cannot be conveyed normally is prevented and simultaneously the deterioration in the S/N ratio is prevented. As a result, the overall cost and the size of a photoelectric converting device can be reduced and thereby the same of an image processing apparatus can be reduced.

According to the present invention, a photoelectric converting device capable of always stably reading an image can be provided.

The individual components shown in outline or designated by blocks in the Drawings are all well known in the photoelectric conversion and image apparatus arts, and their specific construction and operation is not critical to the operation or best mode for carrying out the invention.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of producing an optical device, comprising the steps of:

arranging an optical member and an elastic member having a first molding surface and a second molding surface to form a space defined by the first molding surface, the second molding surface and the optical member, the elastic member being arranged to touch the optical member;

injecting a resin member through an injection port, provided in the elastic member through at least one of the first or second molding surfaces, into the formed space and hardening the resin member; and after the resin member has hardened, taking away the elastic member.

2. A method according to claim 1, wherein the resin member is injected by using an injector.

3. A method according to claim 1, wherein the first molding or the second molding surface is arranged to touch one surface of the optical member and comprises mold release characteristics with the optical member.

4. A method according to claim 1, wherein the elastic member is arranged to touch one surface of the optical member and comprises silicon or rubber.

5. A method according to claim 1, wherein the optical member comprises glass.

6. A method according to claim 1, wherein the optical member comprises a photoelectric converting element.

7. A method according to claim 1, wherein a burr of the hardened resin member is removed.

8. A method according to claim 1, wherein a surface of the optical member and the hardened resin member forms a continuous face.

9. A method according to claim 1, wherein a surface of the optical member is a reference plane of the optical device.

\* \* \* \* \*

UNITED STATES PATENT AND TRADEMARK OFFICE
CERTIFICATE OF CORRECTION

PATENT NO. : 5,621,206
DATED : April 15, 1997
INVENTOR(S) : Kitani et al.

It is certified that error appears in the above-identified patent and that said Letters Patent is hereby corrected as shown below:

Columns 1-20 should be deleted to appear as per attached columns 1-20.

Signed and Sealed this

Thirtieth Day of June, 1998

*Attest:*

BRUCE LEHMAN

*Attesting Officer*  *Commissioner of Patents and Trademarks*

METHOD OF PRODUCING A PHOTOELECTRIC CONVERTING DEVICE

This application is a continuation of application Ser. No. 08/284,989, now abandoned, filed Aug. 4, 1994, which is a division of application Ser. No. 08/001,637, now U.S. Pat. No. 5,352,883, filed Jan. 7, 1993, which was a division of application Ser. No. 07/616,921 now U.S. Pat. No. 5,196,691, filed Nov. 21, 1990.

BACKGROUND OF THE INVENTION

1. Field of the Invention

The present invention relates to a photoelectric converting device having a guide member, and, more particularly, to a photoelectric converting device having a guide member which can be suitably used in an input portion of an image processing apparatus (such as a facsimile machine, an image reader, a digital copying machine, an electronic blackboard and the like) for reading image information of an original sheet by relatively moving the original sheet the image of which is to be read while bringing the original sheet into close contact with a one-dimensional line sensor.

2. Description of the Prior Art

Recently, an elongated line sensor, which can be used in an equal magnification optical system, has been developed as a photoelectric converting device for the purpose of reducing the size and improving the performance of an image processing apparatus such as a facsimile machine and an image reader and the like.

In order to reduce the size and the cost of an image processing apparatus of the type described above, a photoelectric converting device having a guide member has been disclosed which is constituted in such a manner that the equal magnification fiber lens array is replaced by a structure in which light reflected from the original sheet is directly detected by a sensor via a transparent spacer made of, for example, glass.

Figure 1:
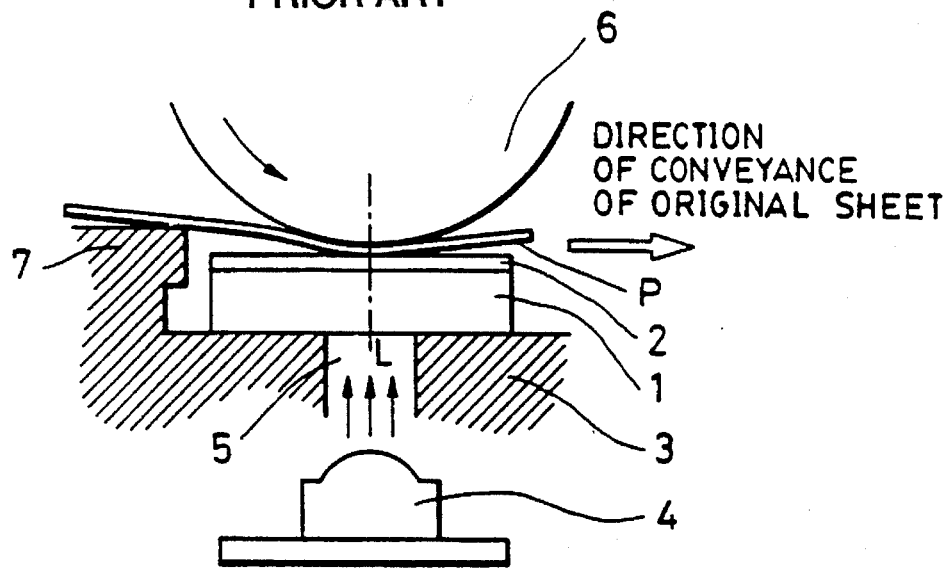
FIGS. 1 and 2 are schematic cross sectional views which respectively illustrate a conventional photoelectric converting device.

FIG. 1 is a schematic cross sectional view which illustrates a conventional photoelectric converting device when viewed from the main scanning direction of a photoelectric converting element array thereof.

Referring to FIG. 1, reference numeral 1 represents a light transmissive sensor substrate constituted in such a manner that a photoelectric converting element (omitted from illustration) is formed on a light transmissive substrate made of glass or the like by a semiconductor manufacturing process or the like. A transparent protection layer 2 made of a thin glass plate or the like is formed on the photoelectric converting element.

The light transmissive sensor substrate 1 is secured to a base plate 3 made of aluminum or the like.

An illumination opening 5 (through which illumination light L emitted from a light source 4 passes) is formed in a portion of the base plate 3. Reference numeral 4 represents the above-described light source for illuminating original sheet P, the light source 4 comprising an LED array composed by arranging a plurality of LED chips in an array-like configuration.

Reference numeral 6 represents a conveyance roller for conveying the original sheet P by bringing the original sheet P into contact with the transparent protection layer 2.

As a result of the structure thus constituted, illumination light L emitted from the light source 4 passes through the light transmissive sensor substrate 1 before it illuminates the original sheet P. Light corresponding to information about the original sheet P and reflected from the same is made incident upon the photoelectric converting device disposed on the light transmissive sensor substrate 1 so that is converted into an electric signal before being transmitted as an image signal.

Referring to FIG. 1, original-sheet conveyance guide means 7 is disposed on the light transmissive sensor substrate 1 on the original-sheet supply side which opposes the original-sheet conveying direction. The structure shown in FIG. 1 is arranged in such a manner that a portion of the base plate 3 is arranged to project so that the original sheet P passes over the surface of the thus formed projection.

Usually, the light transmissive sensor substrate 1 is arranged in such a manner that a multiplicity of photoelectric converting element arrays are, by the semiconductor manufacturing process, formed on the large size glass substrate and the glass substrate, is then sectioned into pieces (each of which contains a photoelectric converting element array) by using a slicer or the like. Therefore, there arises a problem in that burrs (omitted from illustration) such as chipping are formed at the edge of the light transmissive sensor substrate 1.

Accordingly, a structure has been employed in which a gap the size of which corresponds to the size of the burrs which will be formed at the edge of the light transmissive sensor substrate 1 is provided between the guide means 7 and the light transmissive sensor substrate 1.

However, the front portion of the original sheet P will be caught by the above-described gap, causing a jam to occur after the front portion of the original sheet P has been conveyed toward the read portion from the original-sheet supply side.

Therefore, the conventional photoelectric converting device has been arranged in such a manner that the height of the guide means 7 is made larger than that of the light transmissive sensor substrate 1 so that the front portion of the original sheet can be caught by the gap.

However, the conventional photoelectric converting device of the type described above has the following problems where cost and the size of the photoelectric converting device are desired to be reduced.

In order to reduce the overall cost and the size of the photoelectric converting device, it might be considered feasible to employ a method such that the width of the light transmissive sensor substrate, that is, the width of the light transmissive sensor substrate in the direction in which the original sheet is conveyed, is reduced so that the yield of sections of the large-size substrate including the photoelectric converting devices is increased.

However, in the case where the width of the light transmissive sensor substrate 1 in the direction in which the original sheet is conveyed is reduced, the front portion of the guide means 7 and the conveyance roller 6 undesirably come closer to each other, causing the space in which the original sheet is conveyed to be reduced. As a result, a jam will easily occur at the front portion of the original sheet.

For example in a case where an original sheet having a small thickness is conveyed, the front portion of the original sheet usually has a curvature (the front portion of the original sheet usually curves). Therefore, a jam will occur.

Furthermore, in a case where an original sheet having a large thickness is conveyed, the rigidity of the original sheet is too strong, causing the original sheet to be positioned farther from the protection layer. As a result, the depth of field cannot be maintained, causing the S/N ratio to deteriorate critically.

Figure 2:
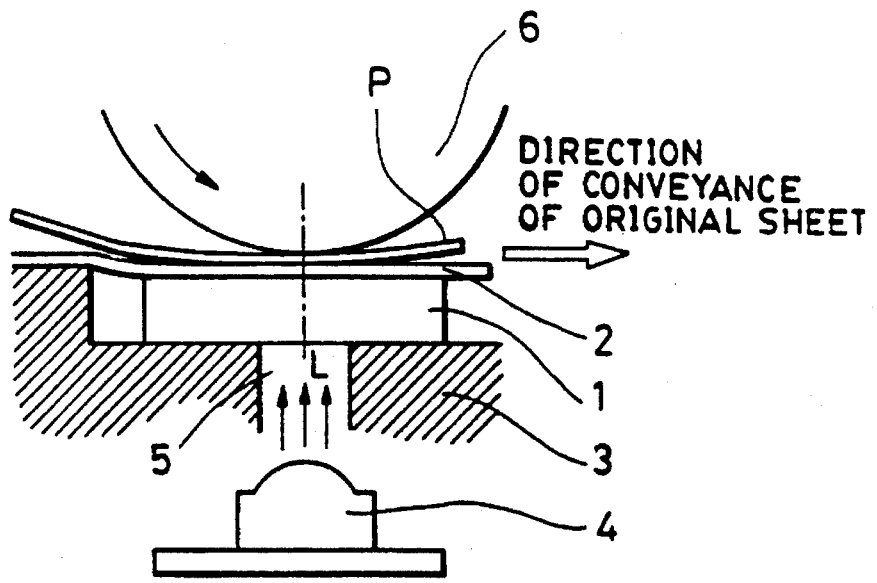

Another disclosure has been made which is, as shown in FIG. 2, arranged in such a manner that the protection layer 2 of the light transmissive sensor substrate 1 and the guide means 7 for conveying the original sheet are combined into one component so as to overcome the above-described problem experienced with the above-described conventional photoelectric converting device.

However, it is very difficult to select a material which is able to perform both the function of the protection layer and the function of the guide means. Therefore, there have been unsolved problems in terms of the overall performance of the photoelectric converting device and the reduction in the maintenance cost.

For example, in a case where an organic film is employed as the above-described material serving the above-described two functions, damages occur in the surface of the film and dust adheres to the same due to the large frictional force generated while conveying the original sheet. As a result, a problem arises in that the S/N ratio will deteriorate with the lapse of time.

SUMMARY OF THE INVENTION

Accordingly, an object of the present invention is to provide a photoelectric converting device having a guide member so that the device is capable of always stably reading an original sheet.

Another object of the present invention is to provide a photoelectric converting device and an image processing apparatus in which the problems of jamming and the original sheet not being conveyed normally can be prevented during the conveyance of the original sheet regardless of the type (the material and the thickness) of the original sheet.

Another object of the present invention is to provide a photoelectric converting device and an image processing apparatus the overall cost and the size of which can be easily reduced.

Another object of the present invention is to provide a photoelectric converting device and an image processing apparatus capable of reliably conveying an original sheet into a focusing range and assuredly reading the original sheet regardless of the type (the material and the thickness) of the original sheet.

A further object of the present invention is to provide a photoelectric converting device and an image processing apparatus exhibiting excellent durability, and which is capable of reducing the maintenance cost or eliminating the necessity of maintenance, which prevents the deterioration in the S/N ratio (during the reading operation) which will occur with the lapse of time.

An aspect of the invention lies in a photoelectric converting device comprising: a plurality of photoelectric converting elements disposed to confront an original sheet the image information of which is to be read; a protection layer disposed on the photoelectric converting elements; a light transmissive substrate on which the photoelectric converting elements are disposed; and flexible guide means disposed on the original-sheet supply side of the light transmissive substrate, the guide means being disposed in such a manner that at least a portion of the guide means is positioned in contact with the edge surface of the light transmissive substrate.

Another aspect of the present invention lies in a photoelectric converting device comprising: a plurality of photoelectric converting elements disposed to confront an original sheet the image information of which is to be read; a protection layer disposed on the photoelectric converting elements; a light transmissive substrate on which the photoelectric converting elements are disposed; and guide means disposed on the original-sheet supply side of the light transmissive substrate, the guide means extending in such a manner that at least a portion of the guide means is positioned in contact with the upper surface of the protection layer.

Yet another aspect of the present invention lies in a photoelectric converting device comprising: a plurality of photoelectric converting elements disposed to confront an original sheet the image information of which is to be read; a protection layer disposed on the photoelectric converting elements; a light transmissive substrate on which the photoelectric converting elements are disposed; and guide means disposed on the original-sheet supply side of the light transmissive substrate, the guide means comprising a film made of a flexible material.

Yet another aspect of the present invention lies in an image processing apparatus comprising: a photoelectric converting device including; a plurality of photoelectric converting elements disposed to confront an original sheet the image information of which is to be read; a protection layer disposed on the photoelectric converting elements; a light transmissive substrate on which the photoelectric converting elements are disposed; flexible guide means disposed on the original-sheet supply side of the light transmissive substrate, the guide means being disposed in such a manner that at least a portion of the guide means is positioned in contact with the edge surface of the light transmissive substrate; a light source for illuminating the original sheet; conveyance means for conveying the original sheet; an output portion for performing recording in accordance with an electric signal denoting image information; and a controller for controlling the photoelectric converting device, the light source, the conveyance means and the output portion.

A further aspect of the present invention lies in an image processing apparatus comprising: a photoelectric converting device including; a plurality of photoelectric converting elements disposed to confront an original sheet the image information of which is to be read; a protection layer disposed on the photoelectric converting elements; a light transmissive substrate on which the photoelectric converting elements are disposed; guide means disposed on the original-sheet supply side of the light transmissive substrate, the guide means extending in such a manner that at least a portion of the guide means is positioned in contact with the surface of the protection layer; a light source for illuminating the original sheet; conveyance means for conveying the original sheet; an output portion for performing recording in accordance with an electric signal denoting image information; and a controller for controlling the photoelectric converting device, the light source, the conveyance means and the output portion.

Another aspect of the present invention lies in an image processing apparatus comprising: a photoelectric converting device including; a plurality of photoelectric converting elements disposed to confront an original sheet the image information of which is to be read; a protection layer disposed on the photoelectric converting elements; a light transmissive substrate on which the photoelectric converting elements are disposed; guide means disposed on the original-sheet supply side of the light transmissive substrate, the guide means being a film made of a flexible material; a light source for illuminating the original sheet; conveyance means for conveying the original sheet; an output portion for performing recording in accordance with an electric signal denoting image information; and a controller for controlling the photoelectric converting device, the light source, the conveyance means and the output portion.

Other and further objects, features and advantages of the invention will be appear more fully from the following description.

BRIEF DESCRIPTION OF THE DRAWINGS

FIGS. 1 and 2 are schematic cross sectional views which illustrate conventional photoelectric converting devices;

FIG. 3 is a schematic cross sectional view which illustrates a first embodiment of a photoelectric converting device according to the present invention;

FIG. 4 is a schematic cross sectional view which illustrates a second embodiment of the photoelectric converting device according to the present invention;

FIG. 5 is a schematic cross sectional view which illustrates a third embodiment of the photoelectric converting device according to the present invention;

FIG. 6 is a schematic cross sectional view which illustrates a fourth embodiment of the photoelectric converting device according to the present invention;

FIGS. 7(a) to 7(g) are schematic views which illustrate a method of manufacturing the photoelectric converting device according to the present invention;

FIG. 8 is a schematic cross sectional view which illustrates a light transmissive sensor substrate according to embodiments shown in FIGS. 1 to 4 and FIGS. 10 to 16 when viewed from the main scanning direction of the photoelectric converting element array;

FIG. 9 is a schematic cross sectional view which illustrates an image processing apparatus to which the present invention can be applied;

FIG. 10 is a schematic cross sectional view which illustrates a fifth embodiment of the photoelectric converting device according to the present invention;

FIG. 11 is a schematic cross sectional view which illustrates a sixth embodiment of the photoelectric converting device according to the present invention;

FIG. 12 is a schematic cross sectional view which illustrates a seventh embodiment of the photoelectric converting device according to the present invention;

FIG. 13 is a schematic cross sectional view which illustrates an eighth embodiment of the photoelectric converting device according to the present invention;

FIG. 14 is a schematic cross sectional view which illustrates a ninth embodiment of the photoelectric converting device according to the present invention;

FIG. 15 is a schematic cross sectional view which illustrates a tenth embodiment of the photoelectric converting device according to the present invention;

FIG. 16 is a schematic cross sectional view which illustrates an eleventh embodiment of the photoelectric converting device according to the present invention;

FIG. 17 is a schematic view which illustrates an ink jet recording head;

FIGS. 18 and 19 are schematic views which respectively illustrate an output portion which can be applied to an image processing apparatus according to the present invention; and FIG. 20 is a block diagram which can be applied to the image processing apparatus according to the present invention.

DESCRIPTION OF THE PREFERRED EMBODIMENTS

An aspect of the present invention lies in a structure arranged in such a manner that guide means for conveying an original sheet is disposed so that at least a portion is positioned in contact with a light transmissive substrate. Another aspect of the present invention lies in structure arranged in such a manner that the guide means for conveying the original sheet is made of a flexible material. Another aspect of the present invention lies in a structure arranged in such a manner that the guide means for conveying the original sheet extends to the surface of the protection layer of the photoelectric converting device.

As a result, a problem such as a jam occurring when the original sheet cannot be conveyed normally can be prevented. Simultaneously, the deterioration in the S/N ratio can be prevented. As a result, the overall cost and the size of the photoelectric converting device can be reduced.

Furthermore, the overall cost and the size of an image processing apparatus having the above-described photoelectric converting device can be reduced.

Now, the present invention will be described in detail with reference to the drawings.

FIG. 3 is a schematic cross sectional view which illustrates a first preferred embodiment of a photoelectric converting element array of a photoelectric converting device according to the present invention when viewed from the main scanning direction.

Reference numeral 1 represents a light transmissive sensor substrate having a photoelectric converting element array (omitted from illustration) formed by a semiconductor manufacturing process on a substrate made of quartz glass or borosilicate glass having light transmissive characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into direct contact with the protection layer 2.

As a result of the structure thus arranged, the illumination light L emitted from the light source 4 passes through the opening 5 formed in the base plate 3 and the light transmissive sensor substrate 1 before it illuminates the original sheet P. Information light L' reflected from the surface of the original sheet P is made incident upon the photoelectric converting element (omitted form illustration) formed on the light transmissive sensor substrate 1 and an image signal is transmitted from the photoelectric converting element.

A guide means 7 for conveying the original sheet P is disposed on the light transmissive sensor substrate 1 on the original-sheet supply side opposing the original-sheet conveyance direction. The guide means 7 is disposed in such a manner that at least a portion thereof is positioned in contact with the edge of the light transmissive sensor substrate 1 and that the protection layer 2, the edge being the edge adjacent to the original-sheet supply side. The guide means 7 is substantially continuously formed with the surface of the protection layer 2. The guide means 7 may be formed in a flat shape as illustrated, a shape having slanted surface or a shape having a curved surface.

The guide means 7 may be secured to the edge portion of the above-described light transmissive sensor substrate 1 or may be positioned in contact with the same. As an alternative to this, the guide means 7 may be disposed with a gap between the light transmissive sensor substrate 1 and the guide means 7 if the gap is small enough to prevent the introduction of the original sheet P. In terms of the prevention of jamming, it is preferable that the guide means 7 be positioned in close contact with the edge of the light transmissive sensor substrate 1.

It is preferable that the guide means 7 be made of an organic resin material such as acryl, unsaturated polyester, polystyrene, hard polyurethane and silicone organic resin materials. In addition, an organic resin material such as polyester, epoxy, polyethylene, vinyl chloride, polypropylene, nylon, and polycarbonate organic resin materials may be employed.

Since the guide means 7 for conveying the original sheet P is secured to the edge of the original sheet supply side of the light transmissive sensor substrate 1 and that of the protection layer 2, no gap is formed between the light transmissive sensor substrate 1 and the guide means 7. Therefore, a jam caused by the introduction of the front portion of the original sheet P into such a gap can be prevented. Furthermore, since the surface of the guide means 7 is continuously formed from the surface of the protection layer 2, no step is formed between the light transmissive sensor substrate 1 and the guide means 7. As a result, even if an original sheet having a large thickness is desired to be read, the original sheet cannot be separated from the surface of the protection layer 2. Consequently, the reduction in the S/N ration can be prevented.

FIG. 4 is a schematic cross sectional view which illustrates the photoelectric converting element array of the photoelectric converting device according to a second embodiment of the present invention when viewed from the main scanning direction. The difference between this embodiment and the first embodiment shown in FIG. 3 is that the guide means according to the first embodiment is arranged to extend to the surface of the protection layer 2, while according to the FIG. 4 embodiment, a portion of the guide means 7 is formed on the protection layer 2 while having a continuous slanted surface from the surface of the protection layer 2.

According to this embodiment, similar to the first embodiment shown in FIG. 3, no gap is formed between the light transmissive sensor substrate 1 and the guide means 7. Therefore, a jam of the original sheet can be prevented. In addition, since this embodiment is arranged in such a manner that the guide means 7 is arranged to have a continuous slanted surface from the surface of the protection layer 2, no step is formed between the protection layer 2 and the guide means 7. As a result, floating of the original sheet can be effectively prevented and the deterioration in the S/N ratio can be prevented.

FIG. 5 is a schematic cross sectional view which illustrates the photoelectric converting element array of the photoelectric converting device according to a third embodiment of the present invention when viewed from the main scanning direction. This embodiment is characterized in that the guide means according to the FIG. 3 embodiment is made of a light shielding material and that a light shielding guide means in provided on the original sheet discharge side.

A light shielding guide means 10 is secured to the edge of the light transmissive sensor substrate 1 and the edge of the protection layer 2. Therefore, unnecessary external light Lx made incident upon the original sheet supply side and the discharge side and illuminating the photoelectric converting element array through the edge of the light transmissive sensor substrate 1 and that of the protection layer 2 can be stopped considerably so that the S/N ratio can be maintained effectively.

If the width of the light transmissive sensor substrate 1 is reduced for the purpose of reducing the overall size and cost, the edge of the photoelectric converting element array and that of the light transmissive sensor substrate 1 come closer to each other. Therefore, the quantity of stray light Ly illuminating the edge of the light transmissive sensor substrate 1 is increased in the illumination light L emitted from the light source 4. As a result, light reflected by the edge illuminates the photoelectric converting element array, causing the S/N ratio to deteriorate.

According to this embodiment, another effect can be obtained in that a portion of the illumination light L is reflected by the edge of the light transmissive sensor substrate 1 into the light shielding guide means 10 so that the quantity of the stray light Ly which illuminates the photoelectric converting element array is reduced so that the deterioration in the S/N ratio is prevented.

The light shielding guide means 10 can be manufactured by mixing pigment into the above-described organic material or by coloring the above-described organic material by a dyestuff.

FIG. 6 is a schematic cross sectional view which illustrates the photoelectric converting element array of the photoelectric converting device according to a fourth embodiment of the present invention when viewed from the main scanning direction. This embodiment is characterized in that the guide means also acts to seal an integrated circuit or an electrical connection means. The light transmissive sensor substrate 1 is formed on a light transmissive circuit substrate 8 having an integrated circuit 9 for operating the photoelectric converting element array or an electrical connection means 24 such as wire bonding. The guide means 7 also acts to seal the integrated circuit 9 or the electrical connection means 24 for the purpose of protecting it.

According to this embodiment, a sealing process necessary in the conventional technology can be performed in the same process in which the guide means is formed. Therefore, the number of the manufacturing processes can be eliminated.

The guide means of the photoelectric converting device according to the present invention can be manufactured by steps depicted in FIGS. 7(a) to 7(g). Now, the manufacturing method will be described with reference to the structure according to the third embodiment of the present invention shown in FIG. 5.

(1) The photoelectric converting element (omitted from illustration) is formed on the sensor substrate 1 by a semiconductor manufacturing process and the sensor substrate 1 is covered by the transparent protection layer 2 and is secured to the base plate 3 (FIG. 7(a)).

(2) The base plate 3 is fastened to a support member 26 (FIG. 7(b)).

(3) A mold 25 for forming the guide means is fastened in such a manner that it directly comes into contact with the surface of the transparent protection layer 2 on the light transmissive sensor substrate 1 (FIG. 7(c)). The above-described process is provided for the purpose of continuously forming the guide means from the surface of the protection layer 2 while making the surface of the transparent protection layer 2 on the light transmissive sensor substrate 1 a reference surface.

The mold 25 has injection ports 27 through which a material for manufacturing the guide means is injected.

Since the material for forming the mold 25 must have elasticity and mold release characteristics, it is preferable to employ silicone or rubber. The reason for the necessity of the elasticity is that the surface of the transparent protection layer 2 must be protected from damage, and the flatness of the light transmissive sensor substrate 1 must be absorbed.

(4) A material 10 for forming the guide means is, by using an injector 28 (for example, a dispenser), injected into a space defined by the mold 25, the base plate 3, the light transmissive sensor substrate 1 and the support member 26 through the injection ports 27 formed in the mold 25 for forming the guide means (FIG. 7(d)).

(5) The material 10 is hardened after it has been injected (FIG. 7(e)).

(6) The mold 25 is released after the material 10 has been hardened (FIG. 7(f)). At this time, burrs 29 are formed due to an influence of the injection port 27.

(7) The burrs 29 are removed and the guide means 10 of the photoelectric converting device according to the FIG. 5 embodiment is produced (FIG. 7(g)).

Although the injection port 27 is formed in the mold 25 according to this embodiment, it may be formed in the support member 26.

FIG. 8 is a schematic cross sectional view which illustrates the light transmissive sensor substrate according to the embodiments shown in FIGS. 3 to 6 when viewed from the main scanning direction of the photoelectric converting element array.

A matrix circuit portion 12, an illumination opening 13, a photoelectric converting element 14, a charge storage portion 15, and a thin-film transistor (TFT) 16 for transferring the stored charge at a proper timing are formed on a glass substrate 11 having light transmission characteristics.

The above-described devices are formed on the glass substrate 11 by successfully layering thereon a lower light-shielding electrode 17 made of Cr, an insulating layer 18 made of SiN, a photoelectric semiconductor layer 19 made of a-Si:H, an ohmic contact layer 20 made of n+a-Si:H and an upper electrode 21 made of Al, the above-described devices being formed by the same manufacturing process.

The photoelectric converting element 14, the charge storage portion 15, and the TFT Portion 16 are covered with a passivation layer 22 made of SiN. The protection layer 2 made of a thin glass plate is, via an adhesion layer 23, formed on the passivation layer 22.

The thin glass plate 2 serves as a wear resistance layer acting to protect the photoelectric converting element 14 or the like from abrasion with the original sheet P and as a spacer acting to maintaining a predetermined distance between the original sheet P and the photoelectric converting element 14.

In the structure constituted as described above, illumination light L emitted from the light source 4 formed on the light transmissive sensor substrate 1 on the side opposing the original sheet P illuminates the original sheet P after it has passed through the light transmissive sensor substrate 1. Information light L' reflected by the surface of the original sheet P is received by the photoelectric converting device 14.

FIG. 9 illustrates an example of an image processing apparatus (for example, a facsimile machine) constituted by using the photoelectric converting device according to the present invention.

Reference numeral 102 represents a feeding roller for feeding the original sheet P toward the reading position and 104 represents a separation member for assuredly separating and successively conveying the original sheets P. Reference numeral 6 represents the conveyance roller disposed at the reading portion of the photoelectric converting device 100, and acts to restrict the surface of the original sheet P to be read and to convey the original sheet P.

Symbol W represents a recording medium in the form of a roll of paper on which image information is formed, the image information being information read by the photoelectric converting device 100 or image information supplied from an outside source in the case where the image processing apparatus is a facsimile machine. Reference numeral 110 represents a recording head for forming the image. According to the present invention, the recording head may be selected from the variety of types such as the thermal head or an ink jet recording head. The recording head may be a recording head of a serial type or a line type. Reference numeral 112 represents a platen roller for conveying the recording medium W to the position at which recording is performed by the recording head 110, and for restricting the surface of the recording medium W on which information is recorded.

Reference numeral 120 represents an operation panel having switches through which operation commands are inputted, and having display portions on which a message and a state of the apparatus and the like are displayed.

Reference numeral 130 represents a system control substrate having, on the surface thereof, a control portion for controlling the overall system, a circuit for operating the photoelectric converting element, a portion for processing the image information and a portion for transmitting/receiving signals. Reference numeral 140 represents a power source of the apparatus.

The structures according to the above-described first to fourth embodiments were respectively applied to the apparatus shown in FIG. 9 so as to perform actual reading. As a result, an image could be very stably read without the occurrence of a jam in any of the combinations.

In particular, an image could be stably read in the third embodiment while preventing excessive light from being incident upon the sensor.

FIG. 10 is a schematic cross sectional view which illustrates the light transmission converting element array of the photoelectric converting device according to a fifth embodiment of the present invention when viewed from the main scanning direction of the photoelectric converting element array.

Reference numeral 1 represents a light transmissive sensor substrate having a photoelectric converting element array (omitted from illustration) formed by a semiconductor manufacturing process on a substrate made of quartz glass or borosilicate glass having light transmission characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into direct contact with the protection layer 2.

As a result of the structure thus arranged, the illumination light L emitted from the light source 4 passes through the opening 5 formed in the base plate 3 and the light transmissive sensor substrate 1 before it illuminates the original sheet P. Information light L' reflected from the surface of the original sheet P is made incident upon the photoelectric converting element (omitted form illustration) formed on the light transmissive sensor substrate 1 before an image signal is transmitted from the photoelectric converting element.

A guide means 7 for conveying the original sheet P is disposed on the light transmissive sensor substrate 1 on the original-sheet supply side opposing the original-sheet conveyance direction in such a manner that the guide means 7 made of a flexible material and acting to convey the original sheet P is positioned in contact with the light transmissive sensor substrate 1.

In the structure in which the guide means 7 is made of a flexible material, the burrs formed at the edge of the light transmissive sensor substrate 1 can be absorbed thanks to the flexibility of the guide means 7 even if the light transmissive sensor substrate 1 and the guide means 7 are brought into contact with each other. Therefore, the conventional necessity of providing a gap between the light transmissive sensor substrate 1 and the guide means 7 can be eliminated.

In the structure in which the guide means 7 is made of a flexible material, it can be easily deformed by the pressure of the conveyance roller 6 even if the height of the guide means 7 which comes in contact with the original sheet P is made larger than the height of the protection layer 2 of the light transmissive sensor substrate 1 which comes in contact with the original sheet P. As a result, the depth of field can easily be maintained.

It is preferable that an organic material be employed to manufacture the guide means 7. For example, a flexible material such as a sponge (which is a porous material) and rubber may be employed. In addition, a material such as polycarbonate and an ABS resin given flexibility due to a forming work may be employed.

As a result of the structure in which the guide means is made of a flexible material, forming of the gap into which the front end portion of the original sheet P can be introduced can be prevented between the light transmissive sensor substrate and the guide means. Therefore, a jam of a type in which the front end portion of the original sheet is introduced into the gap can be assuredly prevented. Furthermore, since forming of an excessively large step can be prevented between the protection layer of the light transmissive sensor substrate and the guide means, the deterioration in the S/N ratio can be prevented regardless of the thickness of the paper.

FIG. 11 is a schematic cross sectional view which illustrates the light transmission converting element array of the photoelectric converting device according to a sixth embodiment of the present invention when viewed from the main scanning direction of the photoelectric converting element array. The difference between this embodiment and the fifth embodiment is that the guide means according to the fifth embodiment shown in FIG. 10 is further provided with electric conductivity. The structure shown in FIG. 11 is arranged in such a manner that the original-sheet conveying side of the surface of the guide means 7 is arranged to be electrically conductive. According to this embodiment, an electrically conductive layer 118 is formed on the original sheet conveying side of the guide means 7 which is made of a flexible material while maintaining the electric potential of the electrically conductive layer 118.

Facsimile machines, image readers, digital copying machines, and electronic blackboards of the type which employ the photoelectric converting device according to the present invention must be arranged in such a manner that the electric circuits provided therein are protected from the static electricity generated during the conveyance of an original sheet. Therefore, an electricity removing brush has been employed.

The electrically conductive layer 118 provided for the guide means according to this embodiment exhibits an effect of reducing the generation of the static electricity generated during the conveyance of an original sheet and thereby protecting the electric circuits provided in the apparatus. As a result, the necessity of providing the electricity removing brush can be eliminated. Another effect will be obtained in that the photoelectric converting device and ICs disposed surrounding the photoelectric converting element are shielded from the static electricity.

The electrically conductive layer 118 can be formed by printing, evaporating or plating ITO, Al, Ni or carbon or the like on a flexible material.

The removal of the static electricity generated during the conveyance of an original sheet will also effectively prevent a jam of the original sheet.

Although electric conductivity is given to the surface of the guide means according to this embodiment, the present invention is not limited to this. The overall body of the guide means may have electric conductivity.

FIG. 12 is a schematic cross sectional view which illustrates the light transmission converting element array of the photoelectric converting device according to a seventh embodiment of the present invention when viewed from the main scanning direction of the photoelectric converting element array. The difference between this embodiment and the fifth embodiment is that a low frictional layer is formed on the original sheet conveying side of the guide means, as shown in FIG. 12.

A low frictional layer 119 has the effect of stably conveying an original sheet by reducing the friction acting between the original sheet P and the guide means.

As the material for manufacturing the low frictional layer 119, a material such as Teflon and polyethylene or the like displaying a small friction coefficient with an original sheet may be used.

FIG. 13 is a schematic cross sectional view which illustrates the light transmission converting element array of the photoelectric converting device according to an eighth embodiment of the present invention when viewed from the main scanning direction of the photoelectric converting element array. The difference between this embodiment and the fifth embodiment shown in FIG. 10 is that the guide means is made of a light shielding member.

A light shielding guide means 1110 has the effect of maintaining the S/N ratio by reducing the quantity of external light Lx which has been made incident upon the converting element array through the original sheet supply side. The reasons for this is light, which illuminates the photoelectric converting element through the edge of the light transmissive sensor substrate 1 is prevented.

The light shielding guide means 1110 according to the eighth embodiment of the present invention can be applied to the embodiments directed in FIGS. 10, 11, and 12.

The structures according to the above-described fifth to eighth embodiments were respectively applied to the apparatus shown in Fig. so as to perform actual reading. As a result, an image could be very stably read without the occurrence of a jam in any of the combinations. In particular, an image could be stably read in the eighth embodiment since the incidence of excessive external light upon the sensor could be prevented.

FIG. 14 is a schematic cross sectional view which illustrates the light transmission converting element array of the photoelectric converting device according to a ninth embodiment of the present invention when viewed from the main scanning direction of the photoelectric converting element array.

Reference numeral 1 represents a light transmissive sensor substrate having a photoelectric converting element array (omitted from illustration) formed by a semiconductor manufacturing process on a substrate made of quartz glass or borosilicate glass having light transmission characteristics and insulating characteristics. A protection layer 2 made of a thin glass plate is disposed on the photoelectric converting element array.

The light transmissive sensor substrate 1 is secured to a base plate 3 made of aluminum or the like. An illumination opening 5, through which illumination light L emitted from a light source 4 passes, is formed in a portion of the base plate 3.

The light source 4 is composed of an LED array in which a plurality of light emitting sources comprising LED chips are linearly arranged.

Reference numeral 6 represents a conveyance roller for conveying original sheet P while bringing it into direct contact with the protection layer 2.

As a result of the structure thus arranged, the illumination light L emitted from the light source 4 passes through the opening 5 formed in the base plate 3 and the light transmissive sensor substrate 1 before it illuminates the original sheet P. Information light L' reflected from the surface of the original sheet P is made incident upon the photoelectric converting element (omitted form illustration) formed on the light transmissive sensor substrate 1 before an image signal is transmitted from the photoelectric converting device.

A guide means 7 for conveying the original sheet P is disposed on the light transmissive sensor substrate 1 on the original-sheet supply side opposing the original-sheet conveyance direction.

The guide means 7 is disposed in such a manner that it extends over the surface of the protection layer 2 in an area which does not come in contact with the conveyance roller 6, the guide means 7 being secured by a guide support member 148 by bonding, forcible fitting, or screw fixing.

Therefore, although the width of the light transmissive sensor substrate is arranged to be small, the space through which the original sheet P is conveyed can be satisfactorily enlarged. Furthermore, a gap into which the front portion of the original may be introduced cannot be formed between the light transmissive sensor substrate and the guide means. Therefore, jamming which takes place in the conventional photoelectric converting device shown in FIG. 1 and which is due to the introduction of the original sheet into the gap formed between the sensor substrate and the guide means can be prevented. Simultaneously, the protection layer of the light transmissive sensor substrate and the guide means are individually formed so that the conveyance roller does not come in contact with the guide means. Therefore, a large frictional force does not act on the guide means. Therefore, the deterioration in the S/N ratio in the conventional photoelectric converting device shown in FIG. 2 due to damage or an adhesion of dust to the film can be prevented.

It is preferable that the guide means 7 be made of a flexible material such as an organic film made, for example, Teflon, PET, PEEK, PC and nylon. In a structure in which the guide means 7 is made of the flexible material, the contour of the guide means is able to correspond to the shape of the protection layer, causing assembling inaccuracies to be absorbed. Furthermore, if an original sheet having a large thickness is to be read, floating of the original sheet can be satisfactorily prevented.

In a case where the guide means is made of a thin plate member, there is a fear that the surface of the protection layer of the light transmissive sensor substrate may be damaged by burrs formed at the edge of the plate member. However, if such burrs can be sufficiently prevented, a plate member such as a thin metal plate and/or a thin plastic plate may be employed. Another structure may be employed which is arranged in such a manner that an organic film of the type described above is provided for the above-described plate member.

Although the thickness of the guide means 7 is determined depending upon the positional relationship with the conveyance roller 6, it is preferable that the thickness be 0.3 mm or less.

As described above, the guide means for conveying an original sheet is arranged to extend over the surface of the protection layer 2 in an area which does not come in contact with the conveyance roller. Therefore, a reduction in the space through which the original sheet is conveyed can be prevented so that jamming of the original sheet is prevented. Simultaneously, the adhesion of dust (which can deteriorate the S/N ratio) can be prevented. As a result, the overall cost and the size of the photoelectric converting device can further be reduced.

FIG. 15 is a schematic cross sectional view which illustrates the light transmission converting element array of the photoelectric converting device according to a tenth embodiment of the present invention when viewed from the main scanning direction of the photoelectric converting element array. The difference between this embodiment and the ninth embodiment shown in FIG. 14 is that the original sheet conveying side of the guide means according to the tenth embodiment is given electric conductivity.

An electrically conductive layer 149 is formed on the original sheet conveying side of the surface of the guide means 7 made of a flexible material such as an organic film. Furthermore, the potential of the electrically conductive layer 14 is maintained at a constant level.

Facsimile machines, image readers, digital copying machines, and electronic blackboards of the type which employ the photoelectric converting device according to the present invention must be arranged in such a manner that the electric circuits provided therein are protected from the static electricity generated during the conveyance of an original sheet. Therefore, an electricity removing brush has been employed in the past.

The electrically conductive layer 149 provided for the guide means according to this embodiment has the effect of reducing the generation of the static electricity generated during the conveyance of an original sheet and thereby protects the electric circuits provided in the apparatus. As a result, the necessity of providing the electricity removing brush can be eliminated. Another effect will be obtained in that the photoelectric converting device and ICs disposed surrounding the photoelectric converting element are shielded from the static electricity.

Similar to the sixth embodiment, the jam of an original sheet due to the static electricity can also be effectively prevented.

The electrically conductive layer 149 can be formed by printing, evaporating or plating an electrically conductive material such as ITO, Al, Ni or carbon or the like on an organic film.

Although electric conductivity is given to the surface of the guide means according to this embodiment, the present invention is not limited to this. Another structure may be employed in which the overall body of the guide means has electric conductivity.

In the case where the electrically conductive layer 149 has light shielding characteristics (for example, metal), the S/N ratio can be improved by preventing the stray light as described earlier.

FIG. 16 is a schematic cross sectional view which illustrates the light transmission converting element array of the photoelectric converting device according to an eleventh embodiment of the present invention when viewed from the main scanning direction of the photoelectric converting element array. The difference between this embodiment and the ninth embodiment shown in FIG. 14 is that the guide means according to the eleventh embodiment shown in FIG. 16 is made of a light shielding material.

Guide means 1410 having the light shielding characteristics is arranged to extend over the surface of the protection layer 2 in an area which does not come in contact with the conveyance roller 6. Therefore, unnecessary external light Lx incident upon the original sheet supply side and illuminating the light transmissive sensor substrate can be considerably reduced so that the S/N ratio can be maintained. The reason for this is that the light incident on, for example, the edge of the light transmissive sensor substrate 1, is prevented and the photoelectric converting element can be shielded from stray light. The guide means 1410 may, of course, be structured in such a manner that it has the light shielding member on the surface thereof or includes the same. The light shielding characteristics can also be obtained by modifying the structures according to the third embodiment shown in FIG. 5. The light shielding guide means 1410 according to the eleventh embodiment can be applied to the embodiments shown in FIGS. 14 and 15.

The guide member according to the above-described ninth to eleventh embodiments were respectively applied to the apparatus shown in FIG. 9 so as to perform actual reading. As a result, an image could be very stably read without the occurrence of a jam in any of the combinations. In particular, an image could be stably read in the eleventh embodiment while preventing excessive light incidence.

The above-described embodiments may be combined as required. For example, a structure may be employed which is arranged in such a manner that the original sheet guide is, as described above, continuously formed and is made of a flexible material. Another structure may be employed which is arranged in such a manner that the original sheet guide is made of a flexible material and film is provided thereon. Another structure may be employed which is arranged in such a manner that the original sheet guide is a guide made of a film which can be compressively deformed.

Another structure may be employed which is arranged in such a manner that the original sheet guide is, as described above, continuously formed and a film is provided thereon.

If necessary, other combinations may be employed. However, it is preferable that the above-described examples be individually employed in terms of preventing an increase in the overall cost and labor necessary to manufacture it.

As an output method which can be applied to the image processing apparatus or the like shown in FIG. 9, a thermal transfer recording method or a thermal sensitive recording method (in which the thermal head is, as described above, employed) or an ink jet recording method (in which an ink jet recording head is employed) may be employed.

The present invention brings about excellent effects particularly in a recording head of the bubble jet system suggested by Canon Inc. among ink jet recording systems.

As to the representative operating principle of such a system, for example, one practiced by use of the basic principles disclosed in, for example, U.S. Pat. Nos. 4,723,129 and 4,740,796 is preferred. The above-described system can be applied to either the so-called on-demand type and the continuous type. In particular, it is effective to combine it with the on-demand type in such a manner that at least one driving signal is supplied to electricity-heat convertors disposed to correspond to the sheet or to a liquid passage in which liquid (ink) is held, the driving signal corresponding to information to be recorded and causing a rapid temperature rise which exceeds the nuclear boiling point of the liquid. The reason for this is that thermal energy, which is able to cause film boiling to be generated in the heat acting surface of the recording head, can be generated in the electricity-heat converters. Thereby, bubbles in the liquid (ink) can be formed to correspond to the above-described driving signals. The liquid (ink) is discharged through a discharging opening in accordance with the growth and the shrinkage of the bubble. As a result, at least one droplet is formed. In the case where the above-described driving signal is arranged to be in the form of a pulse shape, the growth/shrinkage of the bubbles can be quickly and properly conducted. Therefore, a further satisfactory effect can be obtained in that the liquid can be discharged very reliably. As a pulse driving signal of the type described above, it is preferable that a driving signal disclosed in U.S. Pat. No. 4,463,359 and another one disclosed in U.S. Pat. No. 4,345,262 be employed. In the case where the conditions disclosed in U.S. Pat. No. 4,313,124 (which relates to an invention concerning the temperature rise of the above-described heat acting surface), even more satisfactory recording can be performed.

As for the structure of the recording head, the structures disclosed in the above-described U.S. Patents may be arranged in such a manner that the discharge port, the liquid passage and the electricity-heat converter are combined (linear fluid path or a perpendicular fluid path). Another structure disclosed in U.S. Pat. No. 4,558,333 and U.S. Pat. No. 4,459,600 may be arranged in such a manner that the heat acting portion is disposed in a bent portion. In addition, the present invention can be effective in the case where the structure according to the present invention is applied to a structure disclosed in Japanese Patent Laid-Open No. 59-123670 arranged in such a manner that a common slit used as the discharge portion of the electricity-heat converter, and also to another structure disclosed in Japanese Patent Laid-Open No. 59-138461 arranged in such a manner that an opening for absorbing a pressure wave of thermal energy is arranged to correspond to the discharge portion.

Furthermore, the present invention may be employed with the full-line type recording head having a length corresponding to the width of the maximum recording medium on which the recording device is able to record information. Such a recording head may comprise either a structure which is arranged in such a manner that the above-described length is satisfied by a combination of a plurality of recording heads of the type disclosed in the above-described recording heads, or to another structure in which the length is satisfied by an integrated recording head. In either case, the present invention is able to produce excellent results.

In addition, the present invention is effective in a case where an exchangeable chip type recording head is employed which is capable of establishing the electrical connection with the apparatus body and the ink supply when it is coupled to the apparatus body. Furthermore, it is also effective when used with a recording head of a cartridge type.

It is preferable to further stabilize the effect of the present invention by providing a recovery means and a preliminary auxiliary means. The recovery means and the preliminary auxiliary means are provided in the structure of the recording head according to the present invention. Specifically, it is effective when combined with capping means, cleaning means, pressurization or suction means for the recording head, and preliminary heating means or a combination of these means. Furthermore, it is effective to perform a preliminary discharge operation prior to the time of recording.

The present invention is extremely effective when combined with a recording apparatus having a recording mode in which a main color such as black or the like is imaged, or with another recording apparatus capable of imaging a plurality of colors in which a plurality of recording heads are integrally constituted or combined.

Although liquid ink is employed in the above-described embodiments according to the present invention, ink which is a solid at room temperature and ink which is softened at room temperature may be employed. In the above-described ink jet recording apparatus, the temperature is usually controlled in such a manner that the temperature of the ink is controlled in a range between 30° C. and 70° C. so as to make the viscosity of the ink suitable for it to be discharged. Therefore, the ink must be in the liquid form when a signal denoting the fact that the ink is to be used is supplied. In addition, ink which commences to be liquified can be employed in the structure according to the present invention, the ink being ink of a type which can be liquified and discharged in the form of liquid ink when thermal energy is given in accordance with a recording signal and ink of a type which commences to be solidified at the time it reaches the recording medium. Inks of these types are exemplified by inks arranged in such a manner that the temperature rise due to the application of the thermal energy is prevented by utilizing this temperature rise as energy to change the phase of the ink from the solid phase to the liquid phase. Another ink is also exemplified which is arranged in such a manner that it is solidified when it is allowed to stand for the purpose of preventing ink evaporation. In the above-described cases, the ink may be arranged in such a manner that is confronts the electricity-heat converter while being held in the form of liquid or a solid substance in a recessed portion or a through hole formed in a porous sheet, as disclosed in Japanese Patent Laid-Open No. 54-56847 or Japanese Patent Laid-Open No. 60-71260. According to the present invention, it is most effective for the above-described ink that the above-described film boiling method be employed.

Now, the ink jet recording head which is used in the method in which liquid (ink) is discharged by utilizing thermal energy at the time of recording will be briefly described.

FIG. 17 is a schematic structural view of an example of an ink jet recording head of the type described above. Referring to FIG. 17, the ink jet recording head comprises a film-shaped electricity-thermal converting means 1103 formed on a substrate 1102, an electrode 1104, a wall 1105 and a cover member 1106 each of which has been formed by a semiconductor manufacturing process such as etching, evaporation, or sputtering. Recording liquid 1112 is supplied to a common liquid chamber 1108 disposed in the recording head 1101 from a liquid storage chamber (omitted from illustration) through a liquid supply pipe 1107. Reference numeral 1109 represents a connector for the liquid supply pipe 1107. The liquid 1112, which has been supplied to the common liquid chamber 1108, is supplied to a liquid path 1120 due to so-called capillary action before it forms a meniscus at the discharge surface at the front portion of the liquid path 1110 (the orifice surface) so that it can be stably held. When electricity is supplied to the heat-thermal converting means 1103 at this time, the liquid 1112 is rapidly heated so that a bubble is formed in the liquid path 1110. As a result of the expansion and shrinkage of the bubble, the liquid 1112 is discharged through a discharge port 1111 so that a droplet is formed. A multi-nozzle or full line type ink jet recording head is thus constituted in which 128 or 256 discharge ports are densely disposed at a density of 16 nozzles/mm.

Now, an example of a structure in which a recording head of the type described above is used as output means of an image processing apparatus will be described. At this time, the description will be given only with regard to the output portion described earlier.

FIG. 18 is a perspective view which illustrates the external structure of the output portion arranged to act in accordance with the ink jet recording system. Referring to FIG. 18, reference numeral 1801 represents an ink jet recording head (to be abbreviated to "recording head" hereinafter) for recording a desired image by discharging ink in accordance with a predetermined recording signal. Reference numeral 1802 represents a carriage for moving the recording head 1801, which performs the scanning operation, toward the recording line (in the main scanning direction). The carriage 1082 is slidably supported by guide shafts 1803 and 1804 so that it reciprocates in the main scanning direction in synchronization with the action of a timing belt 1808. The timing belt 1808 engaged with pulleys 1806 and 1807 is operated by a carriage motor 1805 via the pulley 1807.

A recording paper sheet 1809 is guided by a paper pan 1810 and is conveyed by a paper feeding roller (omitted from illustration) which is being pressed by a pinch roller, this conveyance of the recording paper sheet 1809 being performed by a paper feeding motor 1816. The thus conveyed recording paper sheet 1809 is conveyed while being brought into close contact with a heater 1811 since the recording paper sheet 1809 is being given a tension by a paper discharge roller 1813 and a spur 1814 and is pressed to the surface of the heater 1811 by a paper retaining plate 1812 made of an elastic material. The recording paper sheet 1809, to which ink jetted by the recording head 1801 has been adhered, is heated by the heater 1811 so that it is fixed to the recording paper sheet 1809 since the water content of the ink is evaporated.

Reference numeral 1815 represents a unit called a "recovery system" which acts to maintain the discharge characteristics at a normal state by removing foreign matter adhered to the discharge port (omitted from illustration) of the recording head 1801 or ink the viscosity of which has been raised excessively.

Reference numeral 1818a represents a cap comprising a portion of the recovery system unit 1815, the cap 1818a acting to cap the discharge port of the ink jet recording head 1801 so as to prevent clogging. It is preferable that the cap 1818a include an ink absorber 1818.

A cleaning blade 1817 is disposed on the recording side of the recovery system unit 1815. The cleaning blade 1817 is arranged to be brought into contact with the surface in which the discharge port of the recording head 1801 is formed so that the foreign matter and ink droplets adhered to the surface of the discharge port are cleaned off.

According to the present invention, an electric signal denoting the image information read by the photoelectric converting device is converted into a recording electric signal by the image processing means before the image information is recorded by the actions of the carriage motor, the paper feeding motor, and the recovery device and the like controlled by a controller such as a CPU (Central Processing Unit).

Another structure may be employed which is arranged in such a manner that the electrical signal denoting the above-described image information is transmitted to another image processing apparatus via a communicating means and then the output is provided from this image processing apparatus.

FIG. 19 is a schematic view which illustrates the output portion of a structure on which a full-line type ink jet recording head 1932 is mounted. Referring to FIG. 19, reference numeral 1965 represents a conveying belt for conveying a recording medium (omitted from illustration), the conveying belt 1965 being arranged to convey the recording medium when a conveying roller 1964 is rotated. The lower surface of the ink jet recording head 1932 is made a discharge port surface 1931 in which a plurality of discharge ports are formed corresponding to the recording region of the recording medium.

Also in this case, recording can be performed similar to the above-described serial type recording head.

The present invention is not limited to the description provided with respect to the output portion, but may be modified.

In the case where the above-described thermal energy recording system is employed, the overall size of the apparatus can be further reduced and the information can be further precisely recorded. Therefore, the effect of the present invention can be further improved and the performance of the image processing apparatus can thereby be improved.

FIG. 20 illustrates an example of a block diagram which can be applied to an image processing apparatus according to the present invention.

As described above, according to the present invention, a problem such as jamming of the original sheet is prevented and simultaneously the deterioration in the S/N ratio is prevented. As a result, the overall cost and the size of a photoelectric converting device can be reduced and thereby the cost and size of an image processing apparatus can be reduced.

According to the present invention, a photoelectric converting device capable of always stably reading an image can be provided.

The individual components shown in outline or designated by blocks in the Drawings are all well known in the photoelectric conversion and image apparatus arts, and their specific construction and operation is not critical to the operation or best mode for carrying out the invention.

Although the invention has been described in its preferred form with a certain degree of particularity, it is to be understood that the present invention is not limited to the details of construction described herein. Rather the described combination and arrangement of parts may be modified with equivalent structure and function to without departing from the spirit and the scope of the invention as hereinafter claimed.

What is claimed is:

1. A method of producing an optical device, comprising the steps of:

arranging an optical member and an elastic member having a first molding surface and a second molding surface to form a space defined by the first molding surface, the second molding surface and the optical member, the elastic member being arranged to touch the optical member;

injecting a resin member through an injection port, provided in the elastic member through at least one of the first or second molding surfaces, into the formed space and hardening the resin member; and after the resin member has hardened, taking away the elastic member.

2. A method according to claim 1, wherein the resin member is injected by using an injector.

3. A method according to claim 1, wherein the first molding or the second molding surface is arranged to touch one surface of the optical member and comprises mold release characteristics with the optical member.

4. A method according to claim 1, wherein the elastic member is arranged to touch one surface of the optical member and comprises silicon or rubber.

5. A method according to claim 1, wherein the optical member comprises glass.

6. A method according to claim 1, wherein the optical member comprises a photoelectric converting element.

7. A method according to claim 1, wherein a burr of the hardened resin member is removed.

8. A method according to claim 1, wherein a surface of the optical member and the hardened resin member forms a continuous face.

9. A method according to claim 1, wherein a surface of the optical member is a reference plane of the optical device.

* * * * *